US012688062B2

(12) United States Patent
Wu et al.

(10) Patent No.: US 12,688,062 B2
(45) Date of Patent: Jul. 21, 2026

(54) DEPENDENCY-AWARE SERVER PROCESSING OF DATAFLOW APPLICATIONS

(71) Applicant: SambaNova Systems, Inc., Palo Alto, CA (US)

(72) Inventors: Po-Yu Wu, Palo Alto, CA (US); Subhra Mazumdar, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 799 days.

(21) Appl. No.: 17/847,045

(22) Filed: Jun. 22, 2022

(65) Prior Publication Data
US 2023/0205580 A1      Jun. 29, 2023

Related U.S. Application Data

(60) Provisional application No. 63/293,478, filed on Dec. 23, 2021.

(51) Int. Cl.
*G06F 9/48*        (2006.01)
*G06F 8/41*        (2018.01)
(Continued)

(52) U.S. Cl.
CPC ............ *G06F 9/4881* (2013.01); *G06F 8/433* (2013.01); *G06F 8/45* (2013.01); *G06F 9/546* (2013.01);
(Continued)

(58) Field of Classification Search
CPC .......... G06F 9/4881; G06F 8/433; G06F 8/45; G06F 9/546; G06F 15/7867; G06F 15/825; G06F 2209/506; G06F 9/5038
(Continued)

(56) References Cited

U.S. PATENT DOCUMENTS 6,122,727 A * 9/2000 Witt ...................... G06F 9/3854
                                          712/216
7,526,634 B1 * 4/2009 Duluk, Jr. ............... G06F 9/546
                                          712/216
(Continued)

FOREIGN PATENT DOCUMENTS

CN        112559156 A       3/2021
CN        113420097 A       9/2021
(Continued)

OTHER PUBLICATIONS

Qadah et. al, QueCC—A Queue-oriented, Control-free Concurrency Architecture, Middleware 2018, dated Dec. 2018, 13 pages.
(Continued)

*Primary Examiner* — Adam Lee
(74) *Attorney, Agent, or Firm* — FP Patents; Sikander M. Khan; Gregory Nordstrom

(57)        ABSTRACT

A computer implemented method comprises a server processing work requests of a work requester. The work requester can communicate to the server a processing dependency of one work request on a second work request. The server can associate the dependency with the work requests and/or a queue of work requests. The dependency include a condition to be met in association with processing the work requests, and the condition can include an action for the server to take in association with processing a work request. A computing system can comprise a work requester, a server, and a set of dependency-aware queues for processing a set of work requests. A queue and/or work requests on the queues can be associated with a processing dependency and the server can process work requests enqueued to the queues in an order based on the dependencies. A work requester/server interface can comprise a dependency framework.

28 Claims, 3 Drawing Sheets

(51) Int. Cl.
G06F 9/54 (2006.01)
G06F 15/78 (2006.01)
G06F 15/82 (2006.01)
(52) U.S. Cl.
CPC ........ G06F 15/7867 (2013.01); G06F 15/825 (2013.01)
(58) Field of Classification Search
USPC ........................................................ 718/106
See application file for complete search history.

(56) References Cited

U.S. PATENT DOCUMENTS

| | | | |
|---|---|---|---|
| 8,387,057 | B2 | 2/2013 | Wilmarth |
| 8,407,429 | B2 | 3/2013 | Rudosky et al. |
| 8,607,249 | B2 | 12/2013 | Otenko |
| 8,745,560 | B1 | 6/2014 | Bhardwaj et al. |
| 8,806,498 | B2 | 8/2014 | Seo et al. |
| 9,223,550 | B1* | 12/2015 | Bastien ...................... G06F 8/20 |
| 9,552,203 | B1* | 1/2017 | Hanumantharayappa ................... G06F 8/33 |
| 10,228,869 | B1* | 3/2019 | Nakibly .................. G06F 3/065 |
| 10,592,241 | B2 | 3/2020 | Zhang et al. |
| 10,719,367 | B1* | 7/2020 | Kim ...................... G06F 9/5005 |
| 11,017,764 | B1 | 5/2021 | Das et al. |
| 11,474,821 | B1* | 10/2022 | Turi ...................... G06F 9/3856 |
| 11,671,251 | B1* | 6/2023 | Copparapu ........... H04L 9/0825 380/44 |
| 2002/0042809 | A1* | 4/2002 | Sachedina ................. G06F 9/52 718/107 |
| 2002/0169935 | A1* | 11/2002 | Krick .................. G06F 12/0831 711/158 |
| 2003/0018692 | A1* | 1/2003 | Ebling .................... H04L 67/63 718/108 |
| 2003/0120708 | A1* | 6/2003 | Pulsipher ............. G06F 9/4881 718/106 |
| 2003/0126265 | A1* | 7/2003 | Aziz ................... G06F 16/9574 709/227 |
| 2003/0185227 | A1* | 10/2003 | Le ........................... H04L 49/90 370/429 |
| 2004/0158572 | A1 | 8/2004 | Bennett et al. |
| 2004/0250000 | A1* | 12/2004 | Jay ........................... G06F 9/546 710/52 |
| 2005/0149937 | A1* | 7/2005 | Pilkington ............. G06F 9/526 718/102 |
| 2005/0222894 | A1* | 10/2005 | Klein .................... G06Q 30/00 705/7.11 |
| 2005/0243847 | A1* | 11/2005 | Bitar .................... H04L 47/527 370/412 |
| 2006/0206534 | A1* | 9/2006 | Banks ................. G06F 11/1474 |
| 2007/0083730 | A1* | 4/2007 | Vorbach ............. G06F 15/7867 712/E9.067 |
| 2007/0088918 | A1* | 4/2007 | Venkatrao .......... G06F 13/1631 711/154 |
| 2008/0168471 | A1* | 7/2008 | Benner .................. H04L 49/90 719/314 |
| 2008/0183688 | A1* | 7/2008 | Chamdani .......... G06F 16/2453 |
| 2008/0189501 | A1* | 8/2008 | Irish .................... G06F 13/1631 711/E12.001 |
| 2009/0089772 | A1* | 4/2009 | Di Balsamo .......... G06F 9/5038 707/999.1 |
| 2009/0319550 | A1* | 12/2009 | Shau ..................... G06F 16/284 |
| 2010/0023664 | A1* | 1/2010 | Chang .................... G06F 13/36 710/112 |
| 2010/0122038 | A1* | 5/2010 | Manovit ................. G06F 9/528 711/144 |
| 2010/0281462 | A1* | 11/2010 | Festa ........................ G06F 8/34 717/118 |
| 2011/0145844 | A1* | 6/2011 | Shafi ...................... G06F 9/547 719/330 |
| 2012/0047353 | A1* | 2/2012 | Gupta ................... G06F 9/4881 712/220 |
| 2012/0200412 | A1* | 8/2012 | Boettner ............... G01D 4/002 340/540 |
| 2012/0221835 | A1* | 8/2012 | Tran ..................... G06F 9/3836 712/E9.028 |
| 2012/0242499 | A1* | 9/2012 | Ree ........................ G01D 4/004 340/870.02 |
| 2013/0036475 | A1* | 2/2013 | Ramachandran ... G06F 21/6218 726/27 |
| 2015/0128142 | A1* | 5/2015 | Fahim ................... G06F 9/4881 718/102 |
| 2015/0178879 | A1* | 6/2015 | Palmer ..................... G06T 1/20 345/506 |
| 2015/0286570 | A1* | 10/2015 | Guthrie ................ G06F 12/128 711/122 |
| 2015/0363229 | A1* | 12/2015 | Wang ..................... G06F 9/4881 718/103 |
| 2016/0180486 | A1* | 6/2016 | Rao ........................... G06T 1/20 345/505 |
| 2016/0267082 | A1* | 9/2016 | Wong ................... G06F 16/164 |
| 2016/0378467 | A1* | 12/2016 | Doshi ............... G06F 9/30098 712/208 |
| 2017/0061512 | A1* | 3/2017 | Avcil .................... H04W 4/023 |
| 2018/0165229 | A1* | 6/2018 | Chhabra ............ G06F 13/1626 |
| 2018/0260193 | A1* | 9/2018 | Polisky .................... G06F 8/33 |
| 2019/0065934 | A1 | 2/2019 | Liu et al. |
| 2019/0065958 | A1 | 2/2019 | Guo et al. |
| 2020/0068340 | A1* | 2/2020 | Rasanen ................ H04W 4/20 |
| 2020/0285964 | A1* | 9/2020 | Cao ...................... G06N 3/047 |
| 2021/0099543 | A1* | 4/2021 | Cooney .................. H04L 67/10 |
| 2021/0265016 | A1* | 8/2021 | Vessere ............... G06V 10/764 |
| 2021/0326175 | A1* | 10/2021 | Herbert ................. G06F 9/541 |
| 2021/0365209 | A1* | 11/2021 | L'Ecuyer ............. G06F 3/0679 |
| 2022/0092247 | A1* | 3/2022 | Koeplinger ............ G06F 8/443 |
| 2023/0063458 | A1* | 3/2023 | Bhuiyan ............. G06F 9/5044 |
| 2023/0077301 | A1* | 3/2023 | Debattista ............ G06F 9/4881 |
| 2023/0185804 | A1* | 6/2023 | Jakschitsch ......... G06F 16/2455 707/718 |
| 2023/0350661 | A1* | 11/2023 | Reed ........................ G06F 8/65 |

FOREIGN PATENT DOCUMENTS

| | | |
|---|---|---|
| EP | 3686734 A1 | 7/2020 |
| WO | 2010142987 A1 | 12/2010 |

OTHER PUBLICATIONS

Abadi et. al, TensorFlow: A System for Large-Scale Machine Learning, 12th USENIX Symposium on Operating Systems Design and Implementation (OSDI '16). Nov. 2-4, 2016, 21 pages.

Podobas et al, A Survey on Coarse-Grained Reconfigurable Architectures From a Performance Perspective, IEEEAccess, vol. 2020. 3012084, Jul. 27, 2020, 25 pages.

M. Emani et al., "Accelerating Scientific Applications With SambaNova Reconfigurable Dataflow Architecture," in Computing in Science & Engineering, vol. 23, No. 2, pp. 114-119, Mar.-Apr. 1, 2021, doi: 10.1109/MCSE.2021.3057203.

Prabhakar et. al., Plasticine: A Reconfigurable Architecture for Parallel Patterns, ISCA 2017, Jun. 24-28, 2017, Toronto, ON, Canada, 14 pages.

* cited by examiner

SYSTEM 300

HOST 340

PROCESSOR 344

REQUESTER 342

MEMORY 346

WORK REQUESTS 348

WORK QUEUES [OPTIONAL] 349

302

DA FRAMEWORK [OPTIONAL] 306

DA SERVER 304

DA QUEUE 308A

WR 320A

WR 320B

DA WORKER 310A

DEPENDENCY 322A

DEPENDENCY 322B

DEPENDENCY 322C

DA QUEUE 308B

WR 324A

WR 324B

DA WORKER 310B

DEPENDENCY 326A

DEPENDENCY 326B

PU 312A

PU 312B

WORK REQUEST 330

WID 332

FUNCTION 334

DATA 336

DEPENDENCIES 338 [OPTIONAL]

DEPENDENCY 350

WID 352

DA QUEUE ID 354

CONDITIONS 356

ACTIONS 358

PRIMITIVES 360

DEPENDENCY-AWARE SERVER PROCESSING OF DATAFLOW APPLICATIONS

CROSS-REFERENCE TO RELATED APPLICATIONS

This application is a continuation of U.S. Patent Application No. 63/293,478, entitled "DEPENDENCY-AWARE QUEUES AND PROCESSOR," filed Dec. 23, 2021 which is incorporated by reference for all purposes.

INCORPORATIONS

The following are incorporated by reference for all purposes as if fully set forth herein:
Prabhakar et al., "Plasticine: A Reconfigurable Architecture for Parallel Patterns," ISCA '17, Jun. 24-28, 2017, Toronto, ON, Canada;
U.S. patent application Ser. No. 16/239,252, filed Jan. 3, 2019, entitled "VIRTUALIZATION OF A RECONFIGURABLE DATA PROCESSOR,";
U.S. patent application Ser. No. 16/922,975, filed Jul. 7, 2020, entitled "RUNTIME VIRTUALIZATION OF RECONFIGURABLE DATA FLOW RESOURCES,";

FIELD OF THE TECHNOLOGY

The technology disclosed relates to dataflow computers and computing systems for executing dataflow computing applications. In particular, the technology disclosed relates to executing dataflow computing applications using reconfigurable processors, such as coarse-grain reconfigurable architectures (CGRAs), and dataflow computing systems comprising heterogeneous processing elements. The technology disclosed further relates to processing functions of dataflow applications in dataflow computing systems.

BACKGROUND

The present disclosure relates to computing systems for performing advanced computing applications, such as emulation of intelligence (e.g., knowledge based systems, reasoning systems, and knowledge acquisition systems) and systems for reasoning with uncertainty (e.g., fuzzy logic systems), adaptive systems, machine learning systems, and artificial neural networks. The present disclosure further relates to reconfigurable processing architectures such as computing systems comprising Coarse-Grained Reconfigurable Architectures (CGRAs) to process such dataflow computing applications, such as Artificial Intelligence applications. Additionally, the present disclosure relates to concurrent processing of functions of dataflow applications in dataflow computing systems.

BRIEF DESCRIPTION OF THE DRAWINGS

The drawings included in the present disclosure are incorporated into, and form part of, the specification. They illustrate embodiments of the present disclosure (hereinafter, "the disclosure) and, along with the description, serve to explain the principles of the disclosure. The drawings are intended to be only illustrative of certain embodiments and are not intended to limit the disclosure.

DETAILED DESCRIPTION

Figure 1:
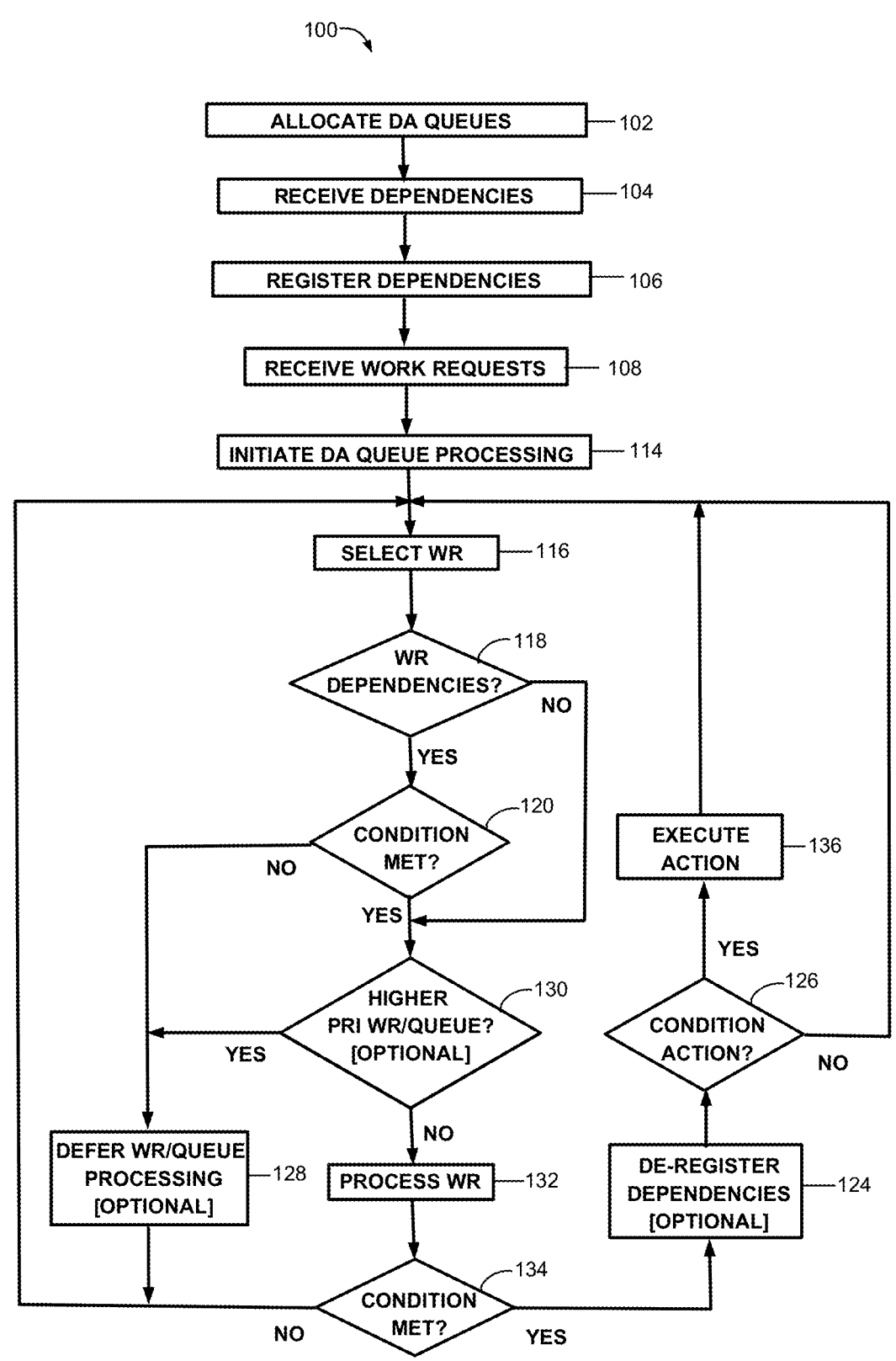
FIG. 1 illustrates an example method for a reconfigurable data flow system to queue and process work requests associated with a dataflow application, according to elements of the disclosure.

Aspects of the present disclosure (hereinafter, "the disclosure") relate to dataflow applications and concurrent processing of computational functions of dataflow applications by a dataflow computing system. More particular aspects relate to a work requester communicating to a server component of a dataflow computing system, dependency relationships among functions of a dataflow application. The work requester can enqueue work requests, associated with the functions of the application, among queues. The server can associate the dependency relationships with queues on which the work requests are enqueued. The server can dequeue the work requests and can process functions included in the work requests, and/or can dispatch and/or schedule the functions for processing by the dataflow computing system, according to the dependency relationships.

Aspects of the disclosure can be appreciated through a discussion of particular example applications, methods, and systems. However, such examples are for only purposes of illustrating the disclosure, and not intended to limit embodiments. Various modifications to the disclosed examples will be readily apparent to those of ordinary skill in the art, and the general principles defined herein may be applied to other embodiments of the disclosure without departing from the spirit and scope of the disclosure. While embodiments of the disclosure are amenable to various modifications and alternative forms, elements of the disclosure are shown by way of example in the drawings and descriptions thereof. It should be understood, however, that the intention is not to limit the disclosure to the particular example embodiments described herein, but to encompass all modifications, equivalents, and alternatives falling within the spirit and scope of the disclosure. Thus, the disclosure is not intended to be limited to the embodiments shown but is to be accorded the widest scope consistent with the principles and features disclosed herein.

Aspects of the disclosure can particularly apply to processors such as Central Processing Unit (CPUs), Graphics Processing Units (GPUs), Field Programmable Gate Arrays (FPGAs), Coarse-Grained Reconfigurable Architectures (CGRAs), Application-Specific Integrated Circuits (ASICs), Application Specific Instruction-set Processor (ASIP), and Digital Signal Processors (DSPs). Embodiments can comprise a system, method, or article of manufacture. One or more features of an embodiment can be combined with a base embodiment. Embodiments that are not mutually exclusive are taught to be combinable. One or more features of an embodiment can be combined with other embodiments.

The disclosure periodically repeats references to these options. However, omission from some embodiments of recitations that repeat these options should not be taken as limiting the combinations taught in the preceding sections— these recitations are hereby incorporated forward by reference into each of the following embodiments.

Particular expressions of the disclosure will be understood to have the following operative meanings:

The phrases "at least one"; "one or more"; and "and/or" are to be understood as open-ended expressions that operate both conjunctively and disjunctively. For example, each of the expressions "at least one of A, B, and C", "at least one of A, B, or C", "one or more of A, B, and C", "one or more of A, B, or C", and "one or more of A, B, and/or C" means A alone, B alone, C alone, A and B together, A and C together, B and C together, or A, B, and C together.

The term "a" or "an" entity refers to one or more of that entity. As such, the terms "a"/"an", "one or more", and "at least one" can be used interchangeably herein.

The terms "comprising", "including", and "having" can be used interchangeably herein.

As used herein, "incorporated subject matter" refers, collectively, to subject matter disclosed, and/or otherwise encompassed, among the disclosures incorporated herein by reference. For purposes of illustrating the disclosure, but not intended to limit embodiments, various terms of the disclosure are drawn from the incorporated subject matter. As used herein, unless expressly stated otherwise, such terms as may be found in the incorporated subject matter have the same meanings, herein, as their meanings in their respective incorporated disclosures.

Turning now to more particular aspects of the disclosure, computing problems have emerged that can be characterized by "dataflow" processing, such as machine learning (ML), and deep machine learning (DML) methods of Artificial Intelligence (AI" applications; image processing; stream processing (e.g., processing of streaming video and/or audio data); natural language processing (NLP); and/or recommendation engines. Applications, such as these examples, can lend themselves to parallel (concurrent) processing of their data, such as by pipelining operations on data and/or executing duplicate operations on different data utilizing parallel processors, and can be referred to as "dataflow applications", reflecting a continuous flow of application data through parallel processing resources. Systems designed to execute dataflow applications, and/or process dataflow application data, can be correspondingly referred to as "dataflow systems".

Data of such applications can comprise enormous volumes of data, and the data can be structured (e.g., databases), unstructured (e.g., documents, social media content, image, audio, and/or video), or a combination of these. Data of such applications can be represented for computational processing as, for example, scalars, matrices, and/or tensors. Data of such applications can comprise data of varying data types (e.g., integer, or floating point), size (e.g., 8, 16, 32, or 64 bytes), and/or precisions (e.g., half precisions, full precision, and double-precision).

Reconfigurable processors, including field programmable gate arrays FPGAs, can be configured to implement a variety of computational and/or data transfer functions more efficiently or faster than might be achieved using a general purpose processor executing a computer program. However, Coarse-Grained Reconfigurable Architectures (CGRAs) can comprise configurable units that are more complex than those used in typical, more fine-grained FPGAs, and may enable faster or more efficient execution of various classes of applications and/or or application functions. Prabhakar, et al., "Plasticine: A Reconfigurable Architecture for Parallel Patterns," ISCA '17, Jun. 24-28, 2017, Toronto, ON, Canada, (hereinafter, "Prabhakar") describes example CGRAs and, systems utilizing such CGRAs, that can be particularly advantageous in dataflow computing system. Accordingly, aspects of the disclosure relate to methods and systems utilizing reconfigurable dataflow resources, such as resources of a CGRA. However, the disclosure is not necessarily limited to such applications and/or computing systems.

As used herein, the term "CGRA" refers interchangeably to a coarse grain reconfigurable architecture and a computing hardware embodiment—such as an integrated circuit, chip, or module—based on, or incorporating, a coarse grain reconfigurable architecture. In embodiments of the disclosure (hereinafter, "embodiments"), systems based on, and/or incorporating, CGRAs, such as the example of Prabhakar, can be particularly adaptable to, and increasingly efficient in, performing dataflow processing. Hardware resources of a CGRA (e.g., PCUs, PMUs, tiles, networks, and/or network interfaces) can comprise one or more Integrated Circuits (ICs). As used herein, the term "chip" refers to an IC (or, combination of ICs) that can embody elements of a CGRA. A chip can typically be packaged in a chip module (e.g., an single chip module, "SCM" or, alternatively, an multi-chip module, "MCM").

As used herein, the term "reconfigurable dataflow system (RDS)" refers to a computing system that is based on, and/or can utilize, reconfigurable dataflow resources, such as resources of CGRAs, to perform operations of dataflow applications. Owing to reconfigurability, reconfigurable dataflow systems can perform these operations more efficiently than systems comprising fixed or non-reconfigurable resources.

U.S. Nonprovisional patent application Ser. No. 16/239,252, "VIRTUALIZATION OF A RECONFIGURABLE DATA PROCESSOR", to Grohoski, et al, (hereinafter, "Grohoski"), and U.S. Nonprovisional patent application Ser. No. 16/922,975, "RUNTIME VIRTUALIZATION OF RECONFIGURABLE DATA FLOW RESOURCES", to Kumar, et al, (hereinafter, "Kumar"), both incorporated herein by reference, illustrate example embodiments of a reconfigurable dataflow architecture and reconfigurable dataflow systems.

As illustrated by the examples of Grohoski and Kumar (see, for example, Grohoski FIG. 1 or Kumar FIG. 16), a reconfigurable data flow system (RDS) can comprise reconfigurable dataflow units (RDUs) comprising a reconfigurable processor ("RP", 110 in Grohoski FIG. 1, or 1610 in Kumar FIG. 16), a host processor, a clock circuit, and a memory. In an RDS node, a runtime processor can perform operations to configure the RDUs and/or components thereof. A host processor and/or runtime processor of a node can communicate via inter-nodal interface (e.g., IB/E in FIG. 10) with those of other nodes, and the communications can facilitate configuring a plurality of nodes in differing racks.

According to these examples, an RP can comprise an array of CUs with configurable buses. As further illustrated by the examples of Grohoski and Kumar (e.g., Grohoski FIGS. 2 and 3, or Kumar FIGS. 17-20), CUs of RPs can comprise arrays ("tiles") of configurable processing and/or memory units (pattern compute units, "PCUs", and pattern memory units, "PMUs") interconnected by switches.

Kumar FIG. 10 further illustrates an RDS comprising a set of racks, each rack comprising one or more RDU nodes, and each RDU node comprising a host processor, a runtime processor, and a plurality of RPs. Also as illustrated in the example of FIG. 10, in an RDS an RDS pod can comprise a plurality of RDS racks; and, an RDS super-pod (not shown in FIG. 10) can comprise a plurality of RDS pods. An RDS can distribute processing of application data among a plurality of CUs of the system. In performing certain applications, an RDS can configure CUs (such as RDUs, RPs of RDUs, and nodes or racks of RDUs) to optimize processing of application functions and/or data among the processing units.

Kumar FIG. 1 illustrates an example RDS for executing user dataflow applications, 102 in Kumar FIG. 1. RDS 100 of Kumar FIG. 1 comprises reconfigurable dataflow resources 178 and runtime processor 166. In embodiments, a runtime processor, such as 166, can manage (e.g., schedule, initiate, and/or control) execution of user applications on RDS resources, such as 178. In particular, a runtime processor can manage distribution of application "work" (functions and associated application data operands/results) to particular resources of the RDS (e.g., RDUs), and can do so to maximize parallelization of processing application functions and/or data among the RDS resources.

As also used herein, the term "application" refers to any computing application, and/or computing system, that utilizes an RDS to perform specialized, or advanced, dataflow processing, such as the previous applications. An application can comprise, for example, an AI and/or ML application, an NLP application, an application for processing unstructured data, and/or a stream processing application. An application can comprise a computing system, and/or one or more programs executing on a computing system, of, and/or coupled to, an RDS. An application can execute, for example, on a host processor included in, or coupled to, an RDS. An application can create an application "model" to organize computational and/or data transfer functions of the application and/or to analyze application data to capture trends in application data. As used herein, the term "application model" and, simply, "model" refers interchangeably to such a model.

A "user" of an RDS can utilize the RDS to perform computational and/or data transfer functions of an application and/or otherwise operate on data of an application. A user of an RDS can be, for example, a human programmer (e.g., a developer) of an application. A user can utilize a computing system coupled to an RDS for purposes of executing an application on the RDS. A user and/or an application can utilize an application programming interface (API) of an RDS to communicate with, and/or invoke, functions and/or services of RDS software components, such as a software development kit, runtime libraries, compilers and/or assemblers, assemblers, functions and/or services that can manage execution of a user application on resources of an RDS, and so forth. In embodiments, an API can comprise a variety of software to software communications schemes, such as, for example but not limited to, programming function calls, data structures, function parameters and return arguments, a command line (CLI) interface, a message passing interface, and shared memory interfaces.

In embodiments a "work requester" (hereinafter, "requester") can generate "work requests" associated with operations and/or data of dataflow applications. A work requester can be a component, and/or function, of a user computing system and/or an application. For example, a requester can comprise an application program, a computing system that can host an application for execution, a component of a work server (e.g., a runtime processor and/or program thereof), or a combination of these. A requester can comprise, for example, an application program of a computing system coupled to an RDS and the requester can communicate with an RDS by means of APIs and/lor communications interfaces. Alternatively, a requester can comprise, for example, an application program executable on processing resources of an RDS. An application program of a requester can be operatively coupled to an RDS using processors, internal communications interfaces (e.g., buses or links), memory of one or more processors of a work server.

A work request can comprise, for example, a set ("batch") of application data and a computational and/or data transfer function of the application (hereinafter, for brevity, "function") to perform using, or upon, the data batch. Computational functions of an application can include (but are not intended to be limited to), for example, operations of a dataflow applications, such as matrix and/or tensor operations (e.g., General Matrix Multiplication, "GeMM", matrix transpose, or All-Reduce); machine learning operations; natural language processing; image processing; processing of streaming data (e.g., streaming audio or video); and so forth. Data transfer functions of an application can include transferring data among memories of a requester and an RDS, such as to move application data associated with a work request from a requester memory to a memory of an RDU of an RDS, and/or to move application data associated with a work request among memories of RDUs of an RDS. A function of a work request can comprise both computational and data transfer functions, or can comprise only a computational or only a data transfer function.

A requester can submit work requests to a work server component of an RDS. A work server can receive the work requests from a requester (e.g., via an API of the RDS and/or work server) and ca n perform the requested operations on data of the work requests. A work server can dispatch the work requests to particular RDS resources (e.g., particular host processors, runtime processors, and/or RDUs of an RDS) for execution. Accordingly, for only purposes of illustrating the disclosure, the disclosure is described in terms of a work server component of an RDS performing operations of work requests, and/or otherwise facilitating execution of work requests. However, this is not intended to limit embodiments and it would be apparent to one of ordinary skill in the art that any variety of computing systems can operate as a work server within the scope and spirit of the disclosure.

As used herein, the terms "in parallel" and "parallelization" refer, interchangeably, to executing application processing (work) concurrently on a plurality of RDS resources (e.g., RDUs), executing application processing in execution pipelines formed within an RDU and/or across a plurality of RDUs, and a combination thereof. To achieve parallelization of application work within and among RDUs, it is advantageous for an RDS to process work requests in parallel to the maximum extent allowable based on the application design or requirements.

According to the requirements of a particular requester (e.g., requirements of an application, or functions of an application, of a requester), work requests can have a "processing dependency" relationship on one or more other work requests. For example, a particular application, and/or functions and/or data of the application, can require processing (in whole or in part), by a server of an RDS, one data batch, or one set of particular data batches, before processing a second data batch, or second set of data batches. Work requests associated with the second data batch(es) have a processing dependency upon the server processing the first data batch(es). A processing dependency among work requests can correspond to a priority of processing particular work requests, some work requests having higher processing priority than others.

A processing dependency can correspond to a type of operation performed in one work request compared to another. For example, in a machine learning application, a work request associated with back propagation (e.g., gradient descent) can have a dependency on one or more work requests associated with matrix multiplication of a tensor, or set of tensors. Thus, a processing dependency (hereinafter, for brevity, "dependency") of a work request can comprise processing that work request (or, alternatively, suspending or deferring processing of that work request) based on a state, and/or result, of processing one or more other work requests. Such dependencies can determine a processing order of an RDS operating on various work requests and/or data batches of work requests.

While a work requester can be aware of dependencies (e.g., based on the design or requirements of an application) among work requests enqueued to one queue on requests that may be enqueued on other queues, such dependencies can be opaque to an RDS (e.g., the RDS does not have awareness of dependencies among individual work requests). Thus, the RDS may process the work requests in an order that cannot, or may not, exploit the full parallelization capabilities of the RDS to execute the application.

For example, a requester can generate a first subset of work requests, in which none of the requests in the subset have a dependency on other work requests. The requester can generate a second subset of work requests that are dependent upon a processing state, and/or result, of the first subset of work requests. If the RDS is unaware of the dependencies on the second set of requests on the first set, the requester is limited to submitting the first subset, awaiting the processing states and/or results, and then submitting the second set of requests. This can require close synchronization of the requester and RDS over the state of particular work requests, such as synchronized interaction of a requester and RDS for the requester to communicate a set of work requests to the RDS, await the RDS processing the work requests to a particular state or result, receiving communication from the RDS, indicating such states or results, and the requester then submitting additional work requests, dependent on those states or results, to the RDS for processing. Such close synchronization can lead to inefficient use of RDS resources, particularly in a virtualized and/or cloud environment, in which resources of the RDS allocated to the requester are idle while processing a subset of work requests.

Further, in some cases only some of the first set of work requests may have a dependency on requests among the second set. Additionally, or alternatively, work requests among the first set may have dependencies on only certain requests among the second set. In such cases, only some work requests among the second set may need to await states/results of processing particular work requests of the first set, while other requests among the second set can, for example, be executed in parallel with requests among the first set. Thus, in this case, the opacity of the work request dependencies to the RDS can lead to inefficient serialization of application execution where parallelization could be otherwise employed by the RDS. Serialization or work request processing or execution can have worse application execution performance, on an RDS, as compared to processing work requests in parallel among multiple queues of work requests.

In virtualized environments, multiple resources of an RDS can be allocated to a particular requester. If the multiple resources allocated to the requester include RDS resources for processing the work request queues and work requests in parallel, such resources can be under utilized based on processing work requests in a serial order. Such under utilization can be especially limiting to sharing resources in a virtual and/or cloud computing environment as a means to increase overall RDS physical resource utilization. Thus, it would be advantageous for an RDS to have awareness of dependencies among work requests of multiple work request queues, and to process the work requests among multiple RDS resources as much in parallel as possible, to achieve higher performance and utilization of RDS physical resources.

In embodiments, a "dependency-aware" (DA) RDS can process work requests concurrently based on dependencies among the work requests. A work requester can identify and communicate, to the DA RDS, the work requests and dependencies. A DA RDS can include a "DA server", or plurality of DA servers, comprising one or more hardware and/or software components that can process work requests having dependencies amongst each other. In embodiments, a DA server can, for example, interact with a requester to receive work requests and/or work request dependencies, and/or perform operations (e.g., functions of an application included in work requests) associated with a processing work requests.

As used herein, the term "DA server" refers to any component, or combination of components, of a computing system, such as an DA RDS, that can perform operations associated with the system and/or DA server interacting with a work requester, processing work requests having dependencies among each other, and/or schedule or dispatch work requests to particular RDS resources for execution by the RDS. Thus, references to a DA server, herein, implicitly also reference a computing system that includes a DA server, such as an RDS that comprises a DA server.

A DA server can comprise any hardware and/or software computing element, or combination of such elements, of a DA RDS, designed to process part or all of a work request, work request dependencies, and/or queues of work requests. A DA server can comprise one or more software processes, software process threads, specialized hardware circuits, one or more RDS nodes or components of RDS nodes (e.g., an RDU), a processor core of a multi-core processor, a thread of a multi-threaded processor, and other such computing elements as would be recognized by one of ordinary skill in the art as suitable to perform operations of work requests and a DA server.

A computing system (e.g., a computing system including a DA RDS) can include a "DA framework" that can comprise interfaces to enable a work requester to identify and/or communicate work requests to a DA server, define dependencies of certain work requests on other work requests of the application, communicate dependencies to a DA server, and/or receive status and/or results of a DA server processing work requests. A DA framework can enable a DA server to process work requests based on the work request dependencies.

A DA framework can comprise an Applications Programming Interface, "API", or set of APIs and/or application execution services to perform operations of a requester and/or DA server such as just described. A DA framework can include, for example, an API of the system (e.g., instructions to a compiler and/or runtime processor) that can identify work requests and dependencies of certain work requests on other work requests of the application. An API of a DA framework can facilitate (e.g., provide programming function calls or identifiers, arguments, and/or parameters) a requester submitting or otherwise communicating work requests, parameters and/or states of work requests, and/or results of processing work requests with the RDU. An API of a DA framework can facilitate a requester defining and/or identifying work requests and/or dependencies of certain work requests on other work requests. A DA framework can comprise a command line interface (CLI) and/or a communications protocol to enable a requester and/or DA server to perform operations of the DA framework.

A DA framework can comprise semantics and/or syntax for a requester to determine and/or identify dependencies among work requests, to identify work requests, to identify work queues including work requests, to communicate dependencies to a DA server, and/or to enqueue/dequeue work requests to/from work queues. A work request can have, or be otherwise associated with, a work request identifier, or "WID". A WID can serve to identify a particular work request from among one or more sets of work requests for execution by the DA server, and a DA framework can include a WID. A work queue can have, or be otherwise associated with, a work queue ID, and a DA framework can include work queue IDs to correspond to particular work queues.

A DA framework can comprise semantics and/or syntax for a requester to define, identify, and/or communicate one or more processing "conditions" associated with a dependency and/or a DA server processing work requests and/or a queue of work requests. A condition can comprise a condition (e.g., a state or result) of processing other work requests that must be met in order to process a particular work request. The conditions can be associated with one or more "conditioned actions" for a requester and/or DA server to take upon determining that one or more of the conditions is met. A DA framework can comprise semantics and/or syntax for a requester to define, identify, and/or communicate condition actions, and/or parameters of conditioned actions (e.g., condition variables, to be described in more detail further on), associated with a condition.

A DA server can be operatively coupled to a requester, such as communicatively coupled to another computing system hosting a requester (e.g., a client computing system of a virtual computing or cloud computing provider, or of a DA RDS). A DA server can receive work requests and associated parameters—including dependencies among work requests—from a requester, perform operations associated with the work requests, and/or communicate to a work requester (e.g., output) results of processing work requests. A DA server can include, or can interact with, APIs and/or other interfaces (e.g., communications interfaces) of a DA framework.

However, these examples embodiments of a DA server are only for purposes of illustrating the disclosure and is not intended to limit embodiments; it would be apparent to one of ordinary skill in the art that a DA server can comprise many variations of computing systems and/or elements to process work requests from a work requester alternative to a DA server such as just described.

A DA RDS can be capable of receiving and processing multiple such work requests concurrently, and/or can be capable of processing multiple work requests in parallel, such as by use of redundant functional units (e.g., RDUs) and/or pipelined processing units (e.g., PCUs). In embodiments, based on the nature of an application associated with a requester, a DA server can execute some work requests (referred to herein as "independent work requests") completely independent of other work requests. That is, independent work requests can comprise work requests of an application that have not dependencies on execution, and/or states of execution, of other work requests. However, as previously described, a work request can have a variety of processing dependencies associated with processing of on one or more other work requests. As used herein, the term "dependent work request" refers to a work request that is dependent upon one or more other work requests of an application. Correspondingly, the term "conditioned work request" refers herein to work requests of the application upon which one or more dependent work requests have dependencies. However, it is to be noted that a conditioned work request can, itself, be also a dependent work request having dependencies on other, conditioned work requests.

A dependency can include a "nested" dependency. For example, a work request. WR1, can have a dependency on another work request, WR2. A dependency including the dependency of WR1 on WR2 can include a dependency of WR2 on a third work request, WR3 (that is, the WR2 dependency on WR3 is nested within the dependency of WR1 on WR2).

In embodiments, a dependency of a dependent work request can comprise one or more conditions that must be met, in association with processing one or more conditioned work requests. A condition of, or associated with, a dependency can comprise a state of processing, in whole or in part, one or more conditioned work requests and/or a result of processing, in whole or in part, one or more conditioned work requests. A state of processing, and/or a result of processing, a conditioned work request can comprise, for example, having performed a particular function of the conditioned work request on data associated with that work request, such as performing an AllReduce operation, or matrix transpose operation, on a data batch of that work request.

In another example, a state of processing, and/or a result of processing, a conditioned work request can comprise transforming data included in the conditioned work request from one form to another, such as transforming vector data to scalar data and/or vice versa. However, these examples are not intended to limit embodiments and it would be apparent to one of ordinary skill in the art that conditions of a dependency of, or associated with, a dependent work request can comprise any of a variety of states and/or results of processing one or more conditioned work requests.

A DA RDS can receive, enqueue/dequeue, and/or process work requests enqueued to work queues. A DA server can dequeue work requests from work request queues for execution of the requests by RDS resources. In embodiments dependencies can comprise "request-to-request", "request-to-queue", and/or "queue-to-queue" dependencies. Conditions of the dependencies can correspond to the such a type of dependency.

A request-to-request dependency can comprise an individual work request, enqueued to one work queue, dependent on one or more particular work requests enqueued to another work queue. For example, work requests WR1 can be enqueued to one work queue, Q1, and work requests WR2 can be enqueued to another work queue, Q2. WR1 can have a request-to-request dependency on WR2, such that WR1 cannot be dequeued from Q1 for processing until WR2 has been processed from Q2. In this example, a condition of a request-to-request dependency can correspond to a DA server partially, or completely, processing WR2 prior to processing WR1.

A request-to-queue dependency can comprise an individual work request, enqueued to one work queue, dependent on all work requests enqueued to another work queue. For example, work requests WR1 and WR2 can be enqueued to one work queue, Q1, and work requests WR3 and WR4 can be enqueued to another work queue, Q2. WR2 can be enqueued in Q1 "behind" of WR1 (i.e., WR2 will be dequeued from Q1 for processing after WR1 is dequeued from Q1 for processing) and, similarly, WR4 can be enqueued in Q2 behind WR3. If WR2 has a dependency on WR4, WR2 has an implicit request-to-queue dependency on Q2 as it will not be dequeued from Q1 for processing until both WR3 and WR4 have been processed from Q2. In this example, a condition of a request-to-queue dependency can correspond to a DA server partially, or completely, processing all work requests enqueued to Q2 prior to processing WR2.

A "queue-to-queue" dependency can be a dependency of all requests enqueued on one work to queue on all work requests enqueued to another work queue. That is, all work requests in one queue can depend on processing states and/or results associated with a DA RDS processing all work requests enqueued to a particular, other work queue. For example, Q1 can be a queue containing work requests all of a type, or nature, that depend on processing all work requests enqueued to another work request queue. Work requests WR1 and WR2 can be enqueued to Q1 and work requests WR3 and WR4 can be enqueued to Q2. WR1 and WR2 and, by implication, Q1 can have a queue-to-queue dependency on Q2, as dependent on processing all work requests (WR3 and WR4) enqueued to Q2 prior to dequeuing for processing WR1 and WR2. Such dependencies can be associated, then, with entire queues, as opposed to the individual work requests among the queues. In this example, a condition of a queue-to-queue dependency can correspond to a DA server partially, or completely, processing all work requests on one queue prior to processing any work requests enqueued to another queue.

A dependency can comprise one or more "conditioned actions" for a DA server to take associated with meeting a condition of a dependency. Conditioned actions associated with a work request dependency, in embodiments, can include taking particular conditioned actions associated with, or upon, a dependent work request (and/or data included in a dependent and/or conditioned work request) and or dependent queue. For example, in association with meeting a condition of a dependency, a conditioned action can comprise processing (in whole or in part) a dependent work request having that dependency.

A conditioned action can comprise activating a processor or a processing thread (e.g., a processor or thread of a host processor and/or the DA server) to process a dependent and/or conditioned work request associated with the dependency. In another example, a conditioned action can comprise communicating a state, and/or a result, of processing of a conditioned work request, associated with a dependency, to a requester. A conditioned action can comprise enabling processing of work requests other than the work request having the dependency, or enabling processing of work requests in a particular work queue. A conditioned action can comprise dequeuing and/or enqueueing a work request (e.g., a dependent work request having had a condition of a dependency met).

In embodiments, a work queue and/or work request can comprise a concurrency primitive. A concurrency primitive can comprise, for example, a multi-processing primitive that can be utilized (e.g., by a one or more requester and/or DA server processes) to activate, suspend, and/or resume processing of one or more work requests. A concurrency primitive can comprise a process and/or thread synchronization primitive, such as a thread lock, semaphore, thread block, and/or Python, POSIX, and/or Java synchronization primitive. A concurrency primitive can comprise a condition variable, such as a condition variable associated with a condition included in, or associated with, a dependency. A conditioned action can comprise, or be associated with, a concurrency primitive and/or operations on a condition variable.

In embodiments, to process work requests having dependencies amongst each other, in an order based on their respective dependencies, work queues can comprise "DA queues". A DA queue can include dependency relationships of work requests enqueued to that queue, and/or can include dependency relationships of work requests enqueued to other queues. Work request processes of an RDS (e.g., software processes/threads, hardware processors and/or devices, or combinations of these) can utilize dependencies associated with, or included in, a DA queue to determine whether or not, and/or when or in what order, to process work requests enqueued on that or other DA queues.

A DA queue can enqueue independent, dependent, and/or conditioned work requests (not necessarily limited exclusively to one particular type of work request among independent, dependent, and conditioned work requests). Correspondingly, the term "independent DA queue" (or, simply "independent queue") refers herein to a DA queue in which one or more independent work requests are enqueued, the term "dependent DA queue" (or, simply "dependent queue") refers herein to a DA queue in which one or more dependent work requests are enqueued, and the term "conditioned queue" refers herein to a DA queue in which are enqueued one or more conditioned work requests.

DA queues, in embodiments, can be resources of a requester, a DA RDS, or a combination of resources of a requester and DA RDS. DA queues can be queues included in a host computer (e.g., such as host processor 302 of Kumar FIG. 3), a runtime processor (e.g., such as runtime processor 166 of Kumar FIG. 3), and/or resources of an RDU (e.g., processors and/or memories of an RDU). DA queues can be accessible to a DA RDS (e.g., a DA server) and/or accessible to the requester, and the DA RDS and/or requester can record, and/or process, work requests in one or more of the work queues. Multiple processing units of a DA RDS (e.g., host processors, runtime processors, RDUs, PCUs, and/or PMUs) can include DA queues, and/or can access and/or process work requests enqueued to one more DA queues.

An RDS (e.g., a DA server of an RDS) can comprise one or more "DA processes". As used herein, the term "DA process" refers to any form of a computing element of an RDS capable of performing operations associated with the RDS performing work requests and/or processing DA queues, such as operations of a method similar or equivalent to example method 100. A DA process can comprise a program, and/or thread of a program, of a requester, DA server, and/or DA worker. A DA process can be executable on a processor of an RDS, such as a host processor, runtime processor, and/or an RDU. A DA process can comprise specialized electronic circuits configured to perform operations of a DA server or, can comprise a combination of programs, processors, memories, and/or specialized circuits.

A DA server can comprise DA queues and/or one or more DA workers". In embodiments a DA worker can be a component of a DA RDS (.g., a component of a DA server)

capable of processing DA queues and/or executing work requests, such as performing functions or operations of work requests and/or their associated data. A DA worker can comprise one or more software programs, software processes and/or process threads. Such programs and/or processes/process threads can be executable on a host processor, runtime processor, and/or processor of a DA RDS, such as a processor of an RDU of a DA RDS. A DA worker can comprise one or more hardware processors (e.g., processors among RDUs of a DA RD S), memories, and/or specialized circuits designed to perform such operations. A DA worker can comprise a DA process. A DA worker can be executable on a processor of an RDS, such as a host processor, runtime processor, and/or an RDU. A DA worker can comprise a combination of programs, processors, memories, and/or specialized circuits.

A DA worker can have access to DA queues and/or work requests enqueued to, or dequeued from, DA queues, to perform operations of work requests. A DA worker can determine dependencies of work requests and/or DA queues, and/or can perform a conditioned action of a dependency. For example, a DA worker can operate on a condition variable associated a conditioned action of a dependency and performing the conditioned action can comprise the DA worker operating on a concurrency variable, such as resuming ("waking") a DA worker suspended ("sleeping") or blocked (e.g., by a thread lock) on a conditional variable. A DA worker can comprise a program, and/or thread of a program, of a requester, an RDS, and/or DA server.

In embodiments, a single DA worker can process work requests on a particular DA queue. For example, a DA worker, "DAW1", can by the sole DA worker to dequeue and process work requests from DA queue Q1. DAW1 can process work requests from Q1 serially, one at a time, or can concurrently process multiple work requests. Alternatively, or additionally, a plurality of DA workers can process work requests on a particular DA queue. For example, DA worker, "DAW1", can dequeue a work request from a DA queue and process that request and, in the meantime, a second DA worker, "DAW2", can dequeue a different work request (e.g., the next request in a FIFO order of the DA queue) from the DA queue and process that request in parallel with DA worker DAW1 processing the first request.

A DA server can manage DA queues and/or work requests enqueued on DA queues. Managing DA queues and/or enqueued work request, in embodiments, can include allocating DA queues; enqueueing work requests to DA queues and/or dequeuing work requests from DA queues; recording work request dependencies; determining conditions of dependencies have, or have not, been met; executing (or, initiating execution of) conditioned actions of dependencies (e.g., processing condition variables); and/or, directing operations of DA workers. A DA server can direct, or otherwise interact with, DA workers to perform such operations.

FIG. 1 illustrates example method 100 for a DA server to process dependent and conditioned work requests using DA queues. For purposes of illustrating the method, but not intended to limit embodiments, the method is described using the example of a DA server, and DA workers of a DA server, operating on DA queues and work requests enqueued to DA queues. However, this is not intended to limit embodiments, and it would be apparent to one of ordinary skill in the art that operations of method 100, and/or methods similar or equivalent to method 100, can be performed by any hardware or software computational element, or combination of hardware and/or software computational elements, of a DA RDS and/or DA server capable of performing, and/or configured to perform, operations of or associated with, work requests and/or DA queues Also for purposes only of illustrating the method, but not intended to limit embodiments, the method is further described with reference to example DA queues, "Q1" and "Q2". In describing the example of method 100, Q1 can represent, for example, a dependent DA queue and Q2 can represent, for example, a conditioned DA queue. Work requests in Q1 can be dependent work requests having dependencies on particular conditioned work requests enqueued in Q2 (e.g., some, or alternatively, all work requests enqueued to Q2), such as request-to-request, request-to-queue, and/or queue-to-queue dependencies on work requests enqueued to Q2.

The example DA queues, Q1 and Q2, can be resources of the DA server. However, this is not to limit embodiments and, in alternative embodiments, DA queues can be included among resources (e.g., a memory and/or registers) of a requester, resources of a DA server, and/or resources of a computing system (or, resources thereof) coupled to a DA server. A DA server, a requester, and/or components of these (e.g., a DA worker) can have access to the queues among such resources.

In embodiments, interactions of a requester and a DA server, such as corresponding to steps and/or operations of method 100, or a method similar or equivalent to the example of method 100, can comprise allocating DA queues; determining and/or communicating work request dependencies (which can include conditions and/or conditioned actions associated with the dependencies) between a requester and DA server; submitting work requests to a DA server and/or DA queue; and/or communicating work request states and/or results between a DA server and requester, and/or between components of a DA server (e.g., RDUs of an RDS processing work requests enqueue to the same and/or differing DA queues).

In performing a method such as 100, a requester and DA server (and/or components of a DA server) can communicate and/or interact using a variety of methodologies and technologies known in the computing arts. For example, a DA server can include an API, and/or a command line interface (CLI), that a program (e.g., an application program) of a requester can utilize to input work requests and/or information (e.g., identifiers of work requests and/or DA queues, and/or parameters of work requests) to a DA server, and/or to receive results and/or states of processing work requests output from a DA server.

In another example, a requester and DA server can communicate by means of a communications protocol comprising messages and/or data exchanged between a requester and DA server, such as request and response messages of a network (e.g., a LAN, WAN, or the Internet) communicated by means of an underlying communications interface suited to the protocol (e.g., a media access or Internet Protocol interface). An API and/or CLI can comprise a communications protocol (e.g., a request and/or response message) and/or a function call of a DA server program.

However, such examples are not intended to limit embodiments. Rather, it will be understood by one of ordinary skill in the art that, in embodiments, various communications and/or other interactions of a requester and a DA server, as disclosed herein, are not limited to the foregoing examples and can comprise any form of computing communications and methodologies known in the art.

Turning now to details of example method 100, in operation 102 a requester can allocate, or request to allocate, DA queues for enqueueing work requests of a requester application. DA queues, among those allocated in 102, can be independent, dependent, and/or conditioned DA queues, according to the requirements of the application. The DA queues can be, or can be associated with, resources of one or both of the requester and the DA server. A requester can request the DA server to allocate the DA queues (which can include requesting resources, such as memories, to form the DA queues). For example, in 102 a requester can utilize an API of the DA server to request the DA server to allocate the DA queues, and the request can include allocating the queues in resources of the RDS or DA server. In another example, in 102 a requester can utilize an API of the DA server to request the DA server to allocate the DA queues in resources of, or allocated to (e.g., by a host or runtime processor of the RDS) the application and/or requester.

Alternatively, in some embodiments, resources to allocate the DA queues can be pre-determined, such as resource (e.g., memories and/or processors) pre-allocated to the application, resources allocated at application compile time to execute the application, and/or resources pre-determined to allocate to the queues as part of an RDS initiating executing the application. Allocating the resources can comprise the DA server (and/or other components of an RDS) binding the resources for the RDS to execute the application.

In response to a request, in 102, to allocate the DA queues, the DA server can, in 102, determine a set of DA queues to associate with the requester, based on the parameters of the request to allocate the queues. The DA server can communicate parameters of the allocated queues to the requester such as, for example, an identify of a first DA queue, a number of DA queues allocated, and the number of work request entries included in, or associated with, each of the allocated DA queues. Additionally, or alternatively, in 102 the DA server can set execution priorities among the allocated DA queues.

In embodiments, an identity of a DA queue can comprise, for example, an ordinal number, and/or a memory address of a DA queue. In addition to an identity of a first (or, "base") DA queue, a DA server can communicate to the requester a "stride", which can be used in combination with the first DA queue identity to form an identity of other allocated DA queues. For example, a DA server can communicate a first queue identity comprising an ordinal number and a stride; the identities of other DA queues among those allocated can be computed, then, as the ordinal number of the first DA queue plus a multiple of the stride, such as the "nth" DA queue being identified as the ordinal identity of the first DA queue plus "n times the stride".

Similarly, a DA server can communicate to the requester a first queue identity comprising a memory address (e.g., a virtual, real, or physical address of that DA queue in a memory) of that first DA queue, and a stride. The identity of another DA queue, among those allocated, can be a memory address computed as the memory of the first DA queue plus a multiple of the stride, such as the "nth" DA queue being identified as the memory address of the first DA queue plus "n times the stride".

In operation 104, the DA server receives, from the requester, work request dependencies. As previously described, the dependencies can comprise request-to-request, request-to-queue, and/or queue-to-queue dependencies of dependent work requests on conditioned work requests and/or conditioned DA queues. The dependencies can be stored in a memory of the application, a memory of the requester, and/or a memory of the RDS, and the DA server can receive the dependencies in the memory. Additionally, or alternatively, the dependencies can be operands or arguments of an API/CLI or data communication, such as an API/CLI or data communication of a DA framework, and the DA server can receive the dependencies from a work requester (or, another component of a computing system coupled to the DA server) via the API/CLI operands/arguments or data of the data communication.

Dependencies received in 104 can include one or more conditions that must be met for the work requests enqueued to the dependent queue to be processed (e.g., a condition corresponding to processing of a conditioned DA queue reaching a particular processing state of a set of work requests enqueued to that DA queue). A dependency, received in 104, can include a conditioned action for the DA server to take upon an associated condition being met. A condition, and/or conditioned action, received in 104 can comprise a concurrency primitive and/or a condition variable associated with a concurrency primitive.

In operation 106 the DA server can record ("register") the dependencies, and/or parameters of dependencies, received in 104, in association with corresponding DA queues. For example, in operation 106 the DA server can register the dependencies received in 104 with one or both of the dependent and conditioned DA queues. To illustrate further, in 106, the DA server can register with a dependent queue, Q1, that work requests in Q1 are dependent on work requests enqueued to another, conditioned, queue, Q2, and/or can register with Q2 that work requests in Q1 are conditioned on work requests enqueued to Q2.

For example, in 106, the DA server can register with dependent Q1 that all work requests enqueued to Q1 are dependent on all work requests enqueued to Q2 (a queue-to-queue dependency). Registering a queue-to-queue dependency of Q1 work requests, in operation 106, can include registering with Q1, for example, an identity of Q2, and/or conditions to be met, and/or conditioned actions to take, associated with the dependencies of Q1 work requests on Q2 work requests. Similarly, registering the queue-to-queue dependency of Q1 work requests, in operation 106, can include additionally, or alternatively, registering with Q2 an identity of Q1, and/or conditions to be met, and/or conditioned actions to take, associated with the dependencies of Q1 work requests on Q2 work requests.

In a second example, the DA server can register, in 106, with dependent Q1 that a particular work request, "WR11", enqueued to Q1 is dependent on all work requests enqueued to Q2 (a request-to-queue dependency). Registering a request-to-queue dependency of work request WR11, in operation 106, can include registering with Q1 an identity of the dependent work request, an identity of the conditioned queue (Q2) associated with work request WR11, and/or conditions to be met, and/or conditioned actions to take, associated with the dependency of WR11 on Q2 work requests. Similarly, registering the request-to-queue dependency of work request WR11, in operation 106, can include registering with Q2 an identity of work request WR11, an identity of Q1, and/or conditions to be met, and/or conditioned actions to take, associated with the dependency of WR11 on Q2 work requests.

In third example, in 106, the DA server can register with Q1 that a work request, "WR12", enqueued to Q1 is dependent on work requests "WR21" and "WR22" enqueued to Q2 (a request-to-request dependency). Accordingly, in operation 106 registering the request-to-request dependencies of work request WR12 on work requests WR21 and WR22 can include registering with Q1 an identity of work request WR11, an identity of the conditioned work requests ("WR21" and "WR22") associated with WR11, WR11 on Q2 work requests associated with the dependency of WR11 on WR21 and WR22.

In 106, the DA server can register the dependencies received in 104 in, or in association with, corresponding dependent and/or conditioned DA queues. For example, a DA server can register a dependency of a dependent work request in, or in association with, a dependent DA queue on which the dependent work request is enqueued, and/or a conditioned DA queue on which the dependent work request has the dependency. The DA server can utilize the dependencies registered in 106 to select, from the DA queues, work requests for processing.

In 106 a DA server can register one or more parameters of the dependencies with, or in association with, DA queues. Dependency parameters can comprise, for example, an identifier of one or more dependent work requests; an identifier of one or more DA queues; a type of dependency, such as a request-to-request, request-to-queue, and/or queue-to-queue dependency; a condition to be met to process a dependent work request; a concurrency primitive, and/or a condition variable associated with a concurrency primitive, associated with a work request and/or DA queue; and/or, a conditioned action associated with meeting a condition of a dependency. A DA queue can comprise, and/or a DA server can associate with a DA queue, a dependency structure (e.g., a data structure, such as a record or list). A DA server can record dependency parameters, received in 106, in a dependency structure of, or associated with, a dependent and/or conditioned DA queue.

In operation 108, the DA server receives work requests to enqueue to the DA queues. In 108, for example, the requester can communicate work requests for enqueuing among the DA queues allocated in operation 102. The work requests can be stored in a memory of the application, a memory of the requester, and/or a memory of the RDS, and the DA server can receive the work requests in the memory. Additionally, or alternatively, the work requests (and/or dependencies received in 104) can be operands or arguments of an API/CLI or data communication of a DA framework, and the DA server can receive the work requests via the API/CLI or data communication operands/arguments.

In embodiments, in 108, the DA server can enqueue the work requests received in 108 to a DA queue among those allocated in 102. The DA server can enqueue work requests to particular DA queues based on their dependencies. For example, in 108 the DA server can enqueue independent work requests, received in 108, to an independent DA queue. In 108 the DA server can enqueue dependent work requests, received in 108, to a dependent queue based on, for example, dependencies registered, or associated, with that dependent queue and/or dependencies registered, or associated, with corresponding conditioned DA queue. In 108 the DA server can enqueue conditioned work requests, received in 108, to a conditioned queue based on, for example, dependencies registered or associated with that conditioned queue, and/or a registered or associated with corresponding dependent queue.

In 108 a DA server can enqueue work requests in a DA queue in a First-In-First-Out (FIFO) order in which the DA server receives the requests from the requester. Alternatively, in 108 a DA server can enqueue the work requests in a DA queue based on other criteria, such as a priority for processing a work request relative to a priority of processing other work requests in the same or alternate queue. A requester, and/or dependencies registered with the DA queues, can indicate to the DA server a particular order in which to enqueue work requests to a particular DA queue.

In 108 the DA server can modify a dependency of a DA queue (whether it is independent, dependent, or conditioned) based on whether work requests, received in 108 and/or enqueued to that DA queue have, or are associated with, dependencies received in 104 and/or registered in 106. Additionally, or alternatively, in 108 the DA server can transfer a work request from one DA queue to another (e.g., from an independent to a conditioned DA queue, or from one dependent DA queue to another dependent or conditioned DA queue) based on whether a request received in 108, and/or a work request or DA queue dependent on a request received in 108, have, or are associated with, dependencies received in 104 and/or registered in 106.

In embodiments, communicating the work requests, in 108, to the DA server can comprise, for example, the requester directly enqueuing work requests in particular DA queues. In another example, an API of a DA framework can enable a requester to specify a work request (e.g., a WID of a request and parameters of the work requests, such as a function and data batch) and an identity of a DA queue. The requester can communicate work requests to enqueue to the intended DA queue using, for example, an API/CLI of the framework, and the DA server can perform operations to enqueue the work request into the specified DA queue. In some embodiments, an identity of a DA queue to enqueue a work request can be implied by, or associated with, a characteristic of a work request, such as a function associated with the work requests, a type or identity of a data batch associated with a work request, or a semantic and/or value of a WID associated with the work request.

In operation 114 the requester or, alternatively, the DA server initiates processing of work requests enqueued to one or more of the DA queues. For example, a DA framework can include an API that a program of a requester can utilize to cause the DA server to initiate processing work requests enqueued to DA queues. Alternatively, or additionally, in 114 a DA server can initiate processing of a DA queue based on states associated with one or more of the DA queues. In 114 a DA server can initiate processing the DA queues based on, for example, events associated with processing the DA queues and/or work requests, such as a processor of an RDS (e.g., an RDU), becoming available, and/or dispatched, to process work requests enqueued to the DA queue, and/or data of a work request becoming available for processing.

In other examples, a DA server can initiate processing the DA queues based on one or more queues becoming "full" (that is, having all available entries of a queue occupied by work requests); based on one or more of the DA queues having a work request enqueued to them; based on a DA queue having no dependent work requests; and/or based on completing processing some other (e.g., conditioned) work requests (or, alternatively, some other operation of the DA server and/or requester, such as transferring or preparing work request data). However, these examples are not intended to limit embodiments and it would be apparent to one of ordinary skill in the art that a variety of criteria can be used by a requester and/or DA server to initiate processing of work requests enqueued to DA queues. In 114, initiating processing of the DA queues can include activating a DA worker, and/or other component(s) of a DA server or DA RDS, such as another DA process of an RDS, to process the DA queues.

In operation 116, a DA server the DA server selects a DA queue and a work request, enqueued to that DA queue, to evaluate as eligible to process. In embodiments, selecting a work request, in 116, can comprise the DA server inspecting a DA queue (e.g., Q1) for the next work request to process (e.g., next according to an ordering of the work requests within the queue, such as FIFO or by work request priority). In an alternative embodiment, in 116 selecting a work request can comprise the DA server activating a DA worker associated with the particular DA queue and the DA worker can select a DA queue and a work request from the queue. In embodiments activating a DA worker can comprise dispatching a DA process to execute on a processor of the RDS to process the DA queue. Activating a DA worker can comprise the DA server, and/or another DA worker (e.g., a DA worker operating on a conditioned DA queue, or work request enqueued to a conditioned DA queue) operating on a condition variable associated with a dependency of a dependent work request and/or dependent DA queue.

In operation 118, the DA server determines if the work request selected in 116 has dependencies, such as previously described (queue-to-queue, request-to-queue, and request-to-request, for example) on other (conditioned) work requests. In 118 the DA server can determine that the work request selected in 116 is a dependent work has a dependency on a conditioned work request, and/or conditioned DA queue, based, for example, on dependencies registered in 106 with the queue from which the work request was selected in 116. Similarly, in 118 the DA server can determine that the work request selected in 116 does not have a dependency on a conditioned work request, and/or conditioned DA queue based on dependencies registered in 106 with the queue from which the work request was selected in 116.

To illustrate further, consider that, among example DA queues, Q1 and Q2, the DA server selects, in 116, Q1 for processing work requests enqueued to Q1. In 118, the DA server can inspect dependencies registered with Q1, and/or work requests enqueued to Q1 (e.g., dependencies included in a work request queued to Q1), to determine if DA queue Q1 has, for example, a queue-to-queue dependency on all work requests enqueued on DA queue Q2. Additionally or, alternatively, the DA server can inspect dependencies registered with Q1, and/or with work requests enqueued on Q1, to determine if Q1 includes work requests having a request-to-queue, and/or request-to-request dependency on work requests enqueued on Q2. In 118, inspecting a dependencies registered with DA queue (e.g., Q1) can include, for example, the DA server inspecting dependency parameters recorded in a dependency structure of, or associated with, Q1 and/or Q2.

If, in 118, the DA server determines that the DA queue selected in 116 or, alternatively, the work request selected in 116, has no dependencies on other work requests and/or DA queues, in operation 130 the DA server can, optionally, determine if there is another DA queue, and/or another work request, having a higher execution priority than that of the DA queue and/or work request selected in 116. If, in 130, the DA server determines that there is another DA queue, and/or another work request, having a higher execution priority, the DA server can select the higher priority work request or DA queue (for example, by repeating operation 116 to select the higher priority work request/DA queue).

Additionally, or alternatively (e.g., if the DA server optionally does not perform 130), in operation 128 the DA server can, optionally, defer processing of the DA queue and/or work request previously selected in 116. In operation 128 a DA server can determine to defer queue processing of a DA queue based, for example, on RDS and/or DA server resources becoming unavailable to process work requests enqueued to the queue. Alternatively, in 128 a DA server can determine to defer processing of the work request and/or DA queue selected in 116 based on, for example, determining, in 128, that processing of the work request and/or DA queue is presently suspended. A DA server can defer processing of a work request selected in 116 based on that the DA server can perform other processing of the DA queue selected in 116, such as processing work requests enqueued on the DA queue that do not having dependencies, or do not having the same dependencies as the work request selected in 116.

In operation 128, deferring processing of a work request or, alternatively, deferring processing of a DA queue, can comprise the DA server determining to not process the work request/DA queue previously selected in 116 and repeating 116 with respect to an alternative work request or DA queue. For example, if the DA server determined, in 130, that there is a higher priority work request or DA queue to process, in 128 the DA server can defer processing of the work request/ DA queue selected in 116 and process the higher priority work request or higher priority DA queue.

In embodiments, deferring processing of a work request and/or DA queue, in 128, can include suspending a DA worker of a requester and/or a DA server (e.g., a DA process), such as a process associated with that DA queue, associated with work requests enqueued to that DA queue or, alternatively, suspending a DA worker not associated with that particular DA queue or that particular work request (e.g., suspending a DA worker associated with other processing of a requester or DA server). Based on the DA server, in operation 128, suspending processing of the DA queue, the DA server can repeat operations 116-134 to select another work request from the same, or alternative, DA queue(s).

In 128 deferring processing of a DA queue, and/or work request, can comprise the DA server (e.g., a DA worker of a DA server) executing a concurrency primitive (e.g., operating on a condition variable to block or suspend a DA worker process) to defer processing of the DA queue and/or work request pending a conditioned action associated with the dependency determined in 118.

In operation 132 the DA server processes the work request selected in 116. In 132 a DA server can, for example, activate or enable a DA worker (e.g., direct an active DA worker, resume a suspended DA worker, or create and activate a new DA worker) to process the work request. The DA worker can be associated with the DA queue and/or work request (e.g., associated with a particular function specified in the work request) selected in 116.

Processing a work request, in 132, can comprise any action or operation associated with a DA queue associated with the work request, executing operations of the work request, and/or communicating with a requester regarding the work request. Processing a work request can comprise a DA worker preparing to execute operations of the work request (e.g., transferring application and/or work request data to prepare to execute operations of the work request). In 132 a DA worker can configure resources of the DA server (e.g., RDUs of an RDS) to execute operations of the work request, schedule and/or dispatch operations of the work request for execution by DA server resources, prepare (e.g., organize, convert, and/or transfer) data associated withe the work request for executing operations of the work request, enqueue the work request to another component of the DA server for executing operations of the work request, and so forth.

In association with, and/or based on, processing, in 132, the work request selected in 116, in operation 134 the DA server determines if a condition of a dependency associated with the work request, such as dependency of a dependent work request, or another DA queue, has been met. For example, in 134 a DA server can determine that a condition of a dependency associated with a different, dependent work request, or dependent DA queue, has been met based on the processing, in 132, of the work request selected in 116. In 134 a DA server can determine if a condition of a dependency has been met based on the processing, in 132, of the work request reaching a particular state (e.g., a state of whole, or partial, completion) and/or having produced a particular result (e.g., transformation of a data batch of the work request to a particular alternative form, or value). To determine if a condition of a dependency has been met, a DA server can, in 134, inspect a DA queue (e.g., a conditioned DA queue) from which the DA server had selected, in 116, the work quest to process, and/or can inspect another DA queue (e.g., a dependent DA queue) associated with a dependency determined in 134. Inspecting the DA queue for dependencies can include the DA server inspecting dependencies recorded in (or, associated with) the DA queue.

To illustrate further, in 116 the DA server can select, for example, work request WR21 from DA queue Q2. Q2 can be, for example, a conditioned DA queue of a queue-to-queue dependency of DA queue, Q1, and/or of a request-to-queue dependency of a work request, WR11, enqueued to Q1. WR21 can, additionally or alternatively, be a conditioned work request of WR11. In 134, based on a processing state, or result, of WR21 the DA server can determine if a condition of the dependency of WR11 on Q2 and/or WR21 has been met. To determine, in 134, if a condition of WR11 has been met, the DA server can inspect dependencies registered with Q2, such as dependencies recorded in a dependency structure of, or associated with, Q2 (or, additionally or alternatively, a dependency structure of, or associated with, Q1).

If, in 134, the DA server determines that a condition of a dependency has been met (e.g., a condition that makes WR11, in the foregoing example, eligible for processing), in operation 124 the DA server can (optionally) de-register the dependency, or a plurality of dependencies associated with the condition, from the DA queue selected in 116, and/or a DA queue dependent on the condition. In 124, de-registering the dependencies can comprise "nullifying" a record of the dependencies the DA queue(s), such as nullifying (e.g., setting to a value representing null data) a dependency structures of the DA queue(s).

In operation 126, the DA server determines if there is an action (e.g., a conditioned action) to perform associated with the condition, determined in 134, having been met. If the DA server determines, in 126, that there is not an action to perform in association with the condition having been met, the DA server can repeat 116 to select another DA queue and/or work request.

On the other hand, if the DA server determines, in 126, that there is an action to perform, in operation 136 performs the action. As previously described, a conditioned action can be recorded among the dependencies (e.g., among dependency parameters) included in, or associated with one or both of a dependent and a conditioned DA queue. Turning again to the foregoing example DA queues Q1 and Q 2 and work request WR11, a conditioned action to execute in 136 can comprise the DA server, for example, initiating (or, activating a DA process to initiate) processing WR11, and, potentially, other work requests enqueued to Q1. In another example, a conditioned action to execute in 136 can comprise the DA server enabling or activating a DA worker to process work requests in Q1 and/or other DA queues (e.g., Q1 and DA queues other than Q2, for example). A conditioned action to take, in 136, can comprise the DA server continuing to process work requests enqueued to Q2. In association with operation 136, the DA server can communicate a status of work requests (e.g., the work request processed in 132, and/or a DA queue and/or work request dependent on the work request processed in 132) to a requester.

In 136, a conditioned action can correspond to an action associated with a concurrency primitive, such as unlocking a thread, signaling a semaphore, or performing other synchronization operations that can enable processing a work request and/or DA queue, associated with (e.g., for which processing is deferred) a particular concurrency primitive. A conditioned action can comprise the DA server processing (e.g., resuming processing) of a DA queue and/or work request suspended or deferred in operation 128.

Returning now to operation 118, if the DA server determines, in 118, that the work request selected in 116 has dependencies (e.g., by inspecting a dependency structure of, or associated with, the DA queue selected in 116), in operation 120 the DA server can determine if one or more conditions of the dependency, or dependencies, has been met. If the DA server determines, in 120, that one or more conditions of the dependency, or dependencies, has been met, the DA server can, optionally, perform operation 130. Alternatively, if the DA server determines, in 120, that one or more conditions of the dependency, or dependencies, has not been met, the DA server can, can optionally, perform operation 128 and, in operation 116, can select another work request among those enqueued to the DA queues. As previously described, in operation 128 the DA server can, optionally, defer processing of the DA queue and/or work request previously selected in 116. Based on determining, in 120, that one or more conditions of the dependency have not been met, the DA server can repeat operation 16 to select another DA queue and/or DA work request for processing.

Figure 2:
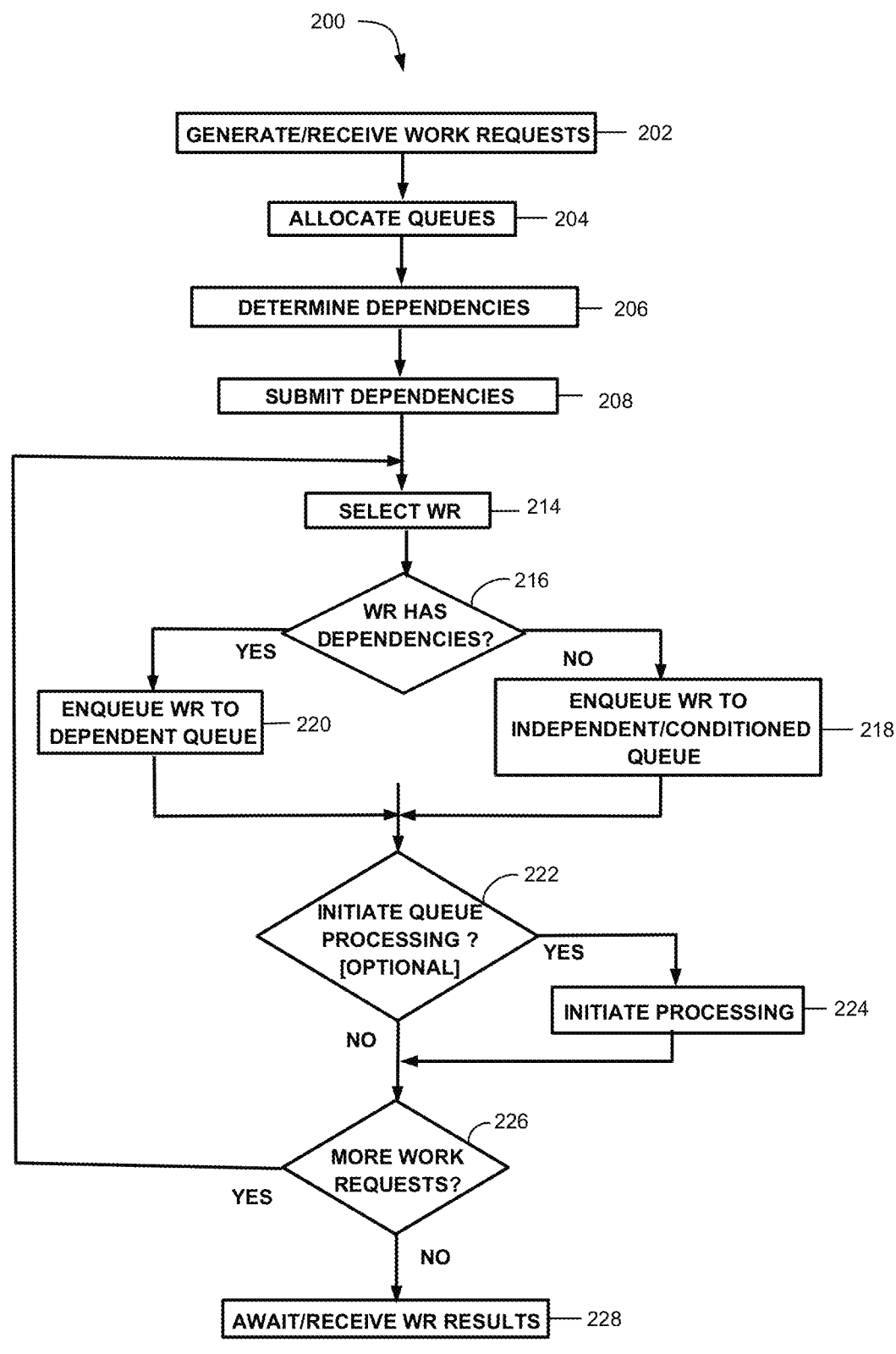
FIG. 2 illustrates an example method for a work requester to queue and process work requests associated with a dataflow application, according to elements of the disclosure.

As illustrated by the example of method 100, in FIG. 1, a DA server can allocate DA queues; receive work requests; receive and register (e.g., record) work request dependencies, conditions, and/or conditioned actions; enqueue/dequeue work requests to/from DA queues; initiate, suspend, and/or resume processing of work requests based on dependencies and/or conditions; and/or perform conditioned actions associated with work request dependencies. FIG. 2 illustrates an example method, 200, that a requester can perform to interact with a DA server to allocate DA queues; submit (e.g., communicate) work requests; communicate work request dependencies, conditions, and/or conditioned actions; enqueue work requests to DA queues; and/or receive with work request status and/or results.

For purposes only to illustrate the method of FIG. 2, but not intended to limit embodiments, the method is described as performed by a requester (hereinafter, "the requester" with reference to method 200) of, or associated with, a dataflow application for execution by an RDS. A requester can be, for example, a program of the application, and/or a program associated with the application or associated with execution of the application. The method is further described, but also not intended to limit embodiments, with reference to a DA server, utilizing DA queues, such as in the example method 100 of FIG. 1, interacting with the requester to receive and process the work requests (e.g., by means of a DA server performing operations of a method similar or equivalent to method 100 of FIG. 1).

Turning to details of example method 200, in operation 202 the requester generates (and/or receives, such as from a computing system that can be a source of application data batches to process) one or more work requests for the DA server to process. The work requests can be work requests such as previously described with reference to the example of FIG. 1. The requester can, for example, generate (and/or receive) a plurality of work requests corresponding to a plurality of data batches associated with the application, or function, of the application and/or functions or operations of a DA server.

In operation 204, the requester can request the DA server to allocate one or more DA queues (which can include requesting resources, such as memories, to form the DA queues). For example, in 204 the requester can utilize an API/CLI of a DA framework to request the DA server to allocate DA queues. The DA server can allocate DA queue resources in resources of the RDS, such as memories of a runtime processor and/or RDU of the RDS.

In another example, the requester can allocate the DA queues (e.g., in a memory of, or accessible to, a requester and a DA server). The requester can provide DA queue resources (e.g., a virtual, real, or physical memory region, and/or processors to manage the queues) for the DA server to allocate the queues. The requester can, in 204, communicate the identify and/or other parameters (e.g., a memory location, number of queue elements, etc.) of the allocated DA queues. In 204 the requester can utilize an API/CLI of a DA framework to request the DA server to allocate the DA queues in resources of, or allocated to (e.g., by a host or runtime processor of the RDS) the application and/or requester. Such DA queue resources can be, for example, resources of the requester or application (e.g., resources of a computing system or environment in which the application is executing), resources of an alternative computing accessible by the DA server (and, optionally, accessible by the requester or application).

DA queues, among those allocated in 204, can be independent, dependent, and/or conditioned DA queues, according to the requirements of the application. DA queues can be among a set of pre-existing, or pre-defined, queues and the DA can allocate the queues by assigning queues among these to the requester for enqueueing the work requests. In 204 allocating DA queues can comprise the DA server (and/or other components of an RDS) binding the resources for the RDS to execute the application. Additionally, in 204 the requester can set execution priorities among the allocated DA queues.

In operation 206, the requester determines dependencies among the work requests generated in 202, such as queue-to-queue, request-to-queue, and/or request-to-request dependencies previously described. If the requester determines, in 206, that one or more of the work requests have dependencies, in operation 208 the requester submits the dependencies to the DA server. The requester can submit the dependencies, in 208, as dependency parameters associated with the dependencies, and/or as dependencies and/or dependency parameters associated with one or more DA queues. The dependencies and/or dependency parameters can be stored in a memory of the application, a memory of the requester, and/or a memory of the RDS, and the requester can, in 206, submit (e.g., communicate) the dependencies and/or dependency parameters to the DA server in the memory.

Additionally, or alternatively, the dependencies and/or dependency parameters can be operands or arguments of an API/CLI of, for example, a DA framework, and the requester can submit the dependencies and/or dependency parameters via the API/CLI. In 208 the requester can communicate to the DA requester information similar to that described in reference to method 100 of FIG. 1, such as an identity of dependent and conditioned work requests, conditions to be met to enable processing a dependent work request, and/or conditioned actions to take when such conditions are met.

In operation 214, the requester selects a work request from among those generated (and/or, received) in 202. In operation 216, the requester determines if the work request selected in 214 has dependencies determined in 206. If the work request has no dependencies (e.g., the work request is an independent work request), in operation 218 the requester can enqueue the work request to an independent DA queue among those allocated in 204. In 216 the requester can further determine that the work request selected in 214 is a conditioned work request of one or more other, dependent work requests. Accordingly, the requester can, in 218, enqueue the work request selected in 214 to a conditioned DA queue among those allocated in 204. Alternatively, if in 216 the requester determines the work request has one or more dependencies (i.e. the work request is a dependent work request), in operation 220 the requester enqueues the work request to a dependent DA queue, among those allocated in 204, associated with those dependencies.

To illustrate in more detail, in 202 the requester can generate/receive example work requests WR1, WR2, WR3, and WR4. In 216 the requester can determine that no work requests among work requests generated WR1, WR2, and WR3 have a dependency on WR4. Accordingly, in 218 the requester can enqueue WR4 to an independent DA queue. In 216 the requester can determine that WR1 and WR2 have a dependency on work request WR3, and/or a DA queue on which WR3 is enqueued. Thus, in operation 218 the requester can enqueue WR4 to a conditioned DA queue, "Q1" for purposes of the example, and in 220 the requester can work requests WR1 and WR2 to a dependent DA queue, "Q2" for purposes of the example. Q1 can have a queue-to-queue dependency among all work requests enqueued to Q1 (WR1, WR2, and any additional work requests enqueued to Q1) on all work requests enqueued to Q2 (WR4 and any additional work requests enqueued to Q2).

Alternatively, Q1 may not have a queue-to-queue dependency on Q2, but one or both of WR1 and WR2 can have a request-to-request dependency on work requests enqueued to Q2. For example, WR1 can have a request-to-request dependency on WR4, such that in 220 the request enqueues WR1 to Q1 and WR4 to Q2. WR2 can have a request-to-request dependency on an additional work request, "WR5", generated in 202 and, in 218, the requester can enqueue WR5 also to Q2.

In some cases, in 220 the requester can enqueue some work requests, having a request-to-queue dependency, on a particular dependent DA queue and can enqueue other work requests, having a request-to-request dependency, on that same dependent DA queue. For example, WR1 can have a request-to-queue dependency on Q2 and the requester can, in 220, enqueue WR1 to Q1. WR2 can have a request-to-request dependency on WR4, enqueued to Q2, and the requester can, in 220, enqueue WR2 also to Q1. Thus, in this example, Q1 does not, itself, have a queue-to-queue dependency even though a work request (WR1) enqueued to Q1 has a request-to-queue dependency.

In optional operation 222 the requester determines whether or not to initiate the DA server processing work requests enqueued to one or more of the DA queues allocated in 204. In embodiments, in 222 a requester can determine to initiate the DA server processing the work requests based, for example, on having generated/received (in 204) a subset of work requests of the application or, alternatively, based on having generated/received (in 204) all work requests of the application. In 222 a requester can determine to initiate the DA server processing the work requests based, for example, on having filled one or more of the DA queues, having enqueued at least some work requests to independent and/or conditioned DA queues, and/or having RDS resources available to process the work requests.

If, in 222, the requester determines to initiate processing of work requests enqueued to the DA queues, in 224 the requester communicates to the DA server to begin processing the DA queues and/or work requests. In 224 the requester can initiate processing of a select subset of the DA queues or, alternatively, can initiate processing of all DA queues allocated in 204. Similarly, in 224, the requester can initiate processing of a select subset of work requests, such as a subset of work requests enqueued to a particular DA queue or, alternatively, can initiate processing of all work requests enqueued to the DA queues allocated in 204.

Initiating processing of the DA queues and/or work requests, in 224, can comprise the requester initiating the processing using an interface such as an API/CLI of a DA framework. An API/CLI of a DA framework can comprise a memory for an requester and DA server to store and retrieve information, such as work requests and/or dependencies, and/or to contain the DA queues. Initiating processing work quests and/or requests, in 224, can comprise the requester, and/or the DA server, enabling an RDU, or other processing resources of an RDS, to process the work requests. Initiating processing work quests and/or requests, in 224, can comprise the requester activating a processor of a host processor executing the application, and/or a processor of the DA server, to operate on the DA queues and/or work requests.

In embodiments, initiating a DA server operating on the DA queues and/or processing work requests enqueued among them, can comprise performing operation 224 associated with any one or more of operations 204-220, and operation 222 can be omitted. In some cases, in an embodiment, processing of DA queues, and/or work requests enqueued among them, can be suspended (e.g., as in operation 128 of method 100 in FIG. 1); in operation 222, a requester can determine to resume processing of suspended DA queues and or work requests; and, in 224 the requester can resume the suspended DA queue and/or work request processing.

In operation 226, the requester determines if there are more work requests, such as work requests generated and/or received in 202, to enqueue to the DA queues. Concurrent with, or in addition to, the requester performing operations among 204-208 and/or 214-226, the requester can repeat 202 to generate/receive additional work requests; and, can repeat 204-208 to allocate DA queues to enqueue the additional work requests, determine dependencies of the additional work requests, and/or submit the dependencies to the DA server. In operation 226, the requester can determine that there are more work requests based, for example, on the requester repeating operation 202 and, optionally, operations 204-208, concurrent or in addition to performing 214-226.

If, in operation 226, the requester has determined that there are more work requests to enqueue, the requester can repeat 214, to select another work request, and can perform 216-226 based on selecting another work request in 214. If, alternatively, the requester determines in 226 that there are not more work requests to enqueue, in operation 228 the requester can await, and/or receive, results of the DA server processing one or more of the work requests enqueued to the DA queues in operations 214-226. While not expressly depicted in FIG. 2, in response to receiving such results from a DA server, the requester can repeat operations among 202-208 and 214-228.

Figures 3A, 3B:
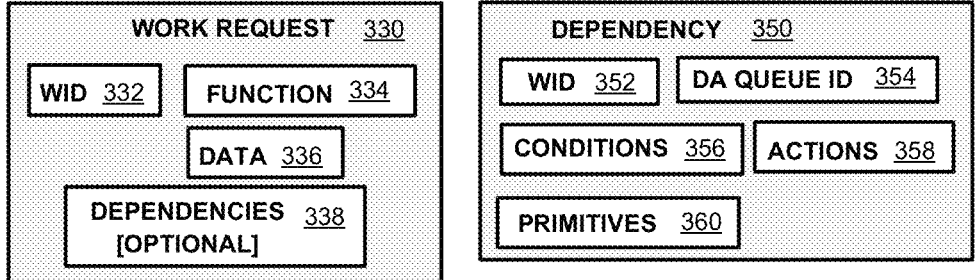
FIG. 3A illustrates an example system comprising work request queueing and processing components, according to elements of the disclosure.
FIG. 3B illustrates an example work request structure and dependency structure, according to elements of the disclosure.

FIG. 3A illustrates an example system, 300, for processing application work requests utilizing DA queues. FIG. 3A depicts system 300 comprising host 340 and dependency-aware processor DA server 304 communicatively coupled by interface 302. In FIG. 3A, system 300 can be, or can include, for example, an RDS (not shown explicitly in FIG. 3A) or a computing system coupled to an RDS. In embodiments requester 342 can be a work requester such as described with reference to methods 100 and 200 of respective FIGS. 1 and 2, and requester 342 can perform operations of methods similar or equivalent to methods 100 and 200 of respective FIGS. 1 and 2. DA server 304 can be a DA server such as described with reference to methods 100 and 200 of respective FIGS. 1 and 2, and can perform operations of methods similar or equivalent to methods 100 and 200 of respective FIGS. 1 and 2.

Host 340 can comprise a computing system, and/or components thereof, such as processor and/or a memory, and host 340 or, resources of host 340, can execute, or can facilitate execution of, requester 342 (e.g., programs or operations of requester 342) and/or interaction of requester 342 and DA server 304. Host 340 can be, for example, a host processor of an RDS, such as host processor 302 of Kumar FIG. 3, and/or can be a host processor coupled to an RDS. FIG. 3A further depicts host 340 comprising requester 342. In embodiments, requester 342 can be a work requester associated with an application, such as described with reference to FIGS. 1 and 2. Requester 342 can comprise one or more programs executable on (or, executed by) host 340. Requester 342 can be a component of an RDS, such as a component of RDS 100 in Kumar FIG. 1, and/or can be a of a computing system, or computing element, coupled to an RDS. Requester 342 can be, can comprise, and/or can otherwise manage (e.g., to facilitate execution of) a dataflow application by an RDS. While FIG. 3A depicts requester 342 included in host 340, this is not intended to limit embodiments and, in alternative embodiments, requester 342 can be, or can be included in, an alternative computing system coupled to DA server 304 and/or host 340.

Requester 342 can perform operations to generate/receive work requests, determine and/or communicate work request dependencies to a DA server, such as in the example of method 100 of FIG. 1, and/or method 200 of FIG. 2. In FIG. 3A, host 340 is shown comprising processor 344 and memory 346, with work requests 348 and optional work queues 349 included in memory 346. In embodiments, processor 344 can be a virtual processor and/or a physical processor, and memory 346 can be a virtual memory and/or a physical memory. Processor 344 can be a processor capable of executing instructions of programs of requester 342, and/or memory 346 can store instructions programs, and/or data, of requester 342.

Work requests 348 can comprise work requests generated, and/or received, by requester 342, such as in operation 202 (or, a similar or equivalent operation) of example method 200 of FIG. 2. Requester 342, or host 340, can optionally include work queues, such as work queues 349 in memory 346 of host 340. Work queues 349 can enqueue work requests among work requests 348, and requester 342 can receive, and/or generate and store work requests among work requests 348 on queues among work queues 349. As previously described in reference to methods 100 and 200, of respective FIGS. 1 and 2, a work requester (and/or a DA server) can allocate DA queues in a memory of the requester, such that work queues 349 can comprise DA queues accessible to DA server 304 (e.g., via interface 302).

DA server 304, can be, or can comprise, a component of an RDS, such as a component of RDS 100 in Kumar FIG. 1. DA server 304 can comprise for example, an RDU, and/or a processor of an RDU, of an RDS, and/or can comprise a processor and/or programs coupled to an RDS. DA server 304 can comprise one or more programs executable on, for example, a host processor of, or coupled to, an RDS; a runtime processor of, or coupled to, an RDS; and/or, one or more processors of an RDS (e.g., one or more RDUs). DA server 304 can comprise DA processes such as previously described.

In embodiments, DA server 304 can be, or can comprise, a component of, a virtualized and/or cloud computing system. A requester, and/or application, can be a component of a virtual machine, or can utilize a virtual machine. A requester can be coupled, via a virtualized or cloud environment, to an RDS. Physical resources of a DA server, such as physical processors and/or memories, can be virtual resources of a virtual machine and/or cloud computing environment accessible to a requester. DA server 304 can be, or can be communicatively coupled to, a virtualized dataflow computing system, such as a virtualized RDS.

DA server 304 can be or comprise a component of, or can be communicatively coupled to, a private cloud, a public cloud, and/or a hybrid cloud. A cloud service provider can provide access to a cloud consumer (e.g., an individual or entity using services of a cloud provider) to perform DA processing functions for an application of the consumer, and the consumer can be or comprise a requester, such as 342. A cloud service provider can provide the DA processing service to the consumer as, for example, a SaaS or IaaS service, in which a DA server is included in, or utilized by, the SaaS and/or IaaS services. A requester (and/or an application), such as 342, can be a client to a virtual (and/or virtualizing) and/or cloud computing system including DA server 304.

FIG. 3A further illustrates host 340 and DA server 304 operatively coupled by means of interface 302. In embodiments, DA server 304 and/or requester 342 can perform operations of methods similar or equivalent to example methods 100 and/or 200, of respective FIGS. 1 and 2, to enqueue and process work requests. DA server 304 and requester 342 (and/or host 340) can utilize interface 302 to communicate and/or interact regarding such operations. While FIG. 3A depicts host 340 as coupled to DA server 304, this is not to limit embodiments, and host 340 can be, for example, a host processor of a DA server and/or an RDS.

In FIG. 3A, DA server 304 is shown comprising DA workers 310A and 310B (collectively, "DA workers 310"), processing units PU 312A and 312B (collectively, "PUs 312"), and DA queues 308A and 308B (collectively, "DA queues 308"). In embodiments, PUs 312A and/or 312B can be processing units included in a computing system, and can include processors and/or memories to execute programs of DA server 304 and/or components of DA server 304 (e.g., programs of DA workers 310). PUs 312A and/or 312B can be, or can comprise, processors, such as RDUs, of nodes of an RDS, such as nodes among nodes 1022a-1022n, and/or 1024a-1024b, of Kumar FIG. 10. PUs 312A and/or 312B can comprise, for example, host processors, runtime processors, and/or RDUs, of an RDS.

DA workers 310 can be DA workers such as previously described (e.g., DA processes that can process DA queues and/or work requests enqueued to DA queues) in reference to methods 100 and/or 200 of respective FIGS. 1 and 2. DA workers 310 can include, for example, application programs, software threads/processes, processors (e.g., specialized hardware elements and/or processors, processor cores and/or threads, accelerator processors, etc.) and/or programs of a DA server and/or RDS. Programs of DA workers 310 can execute on processors of DA server 304, such as processors of PUs 312. DA workers 310 can be programs executing on a plurality of processors (e.g., cores and/or threads of a processor).

DA workers 310A and 310B can operate on the same and/or different DA queues. For example, DA worker 310A and/or 310B can comprise DA processes executing on one or more processors of DA server 304 (e.g., RDUs and/or PCUs of PU 312A and/or 312B). FIG. 3A depicts DA worker 310A operating on DA queue 308A (and/or work requests enqueued on DA queue 308A), a d DA worker 310B operating on DA queue 308B, in embodiments (and/or work requests enqueued on DA queue 308B). However, in embodiments DA worker 310A can additionally, or alternatively, operate on DA queue 308A (and/or work requests enqueued on DA queue 308A) and DA worker 310B can additionally, or alternatively, operate on DA queue 308B (and/or work requests enqueued on DA queue 308B). DA worker 310A and/or 310B can operate on multiple DA queues concurrently, and/or each of DA workers 310 can operate on a particular DA queue concurrently with the other operating on the same or different DA queue.

As previously described, a DA server and/or a DA queue can include dependency structures to record work request and/or DA queue dependencies, conditions, conditioned actions, and/or dependency parameters corresponding to dependencies, conditions, and/or conditioned actions. FIG. 3A further illustrates DA queue 308A comprising work requests WR 320A and 320B (collectively, "WRs 320"), and dependency structures dependencies 322A, 322B, and 322C (collectively, "dependencies 322") and DA queue 308B comprising work requests 324A and 324B (collectively, "WRs 324"), and dependencies 326A, and 326B (collectively, "dependencies 326"). In embodiments WRs 320 and/or WRs 324 can be, or can comprise, work requests such as previously described with reference to methods 100 and 200 of respective FIGS. 1 and 2. WRs 320 and/or WRs 324 can comprise, for example, a work request id (WID), one or more function identifiers (e.g., identifiers of dataflow functions or operations to perform on application data), and/or data associated with the function(s).

Dependencies 322 and/or 326 can comprise work request dependencies such as previously described with reference to methods 100 and 200 of respective FIGS. 1 and 2. Dependencies 322 and/or 326 can comprise, for example, queue-to-queue dependencies of DA queue 308A on DA queue 308B, or vice versa. Dependencies 322 and/or 326 can comprise request-to-queue dependencies of work requests among work requests WRs 320 on DA queue 308B or, alternatively, request-to-queue dependencies of work requests among work requests WRs 324 on DA queue 308A. Dependencies 322 and/or 326 can comprise request-to-request dependencies of work requests among work requests WRs 320 on work requests among work requests WRs 324; or vice-versa.

Dependencies 322 and/or 326 can comprise, for example, an identity (e.g., a WID) of one or more work requests; a DA queue ID corresponding to a dependent and/or conditioned DA queue (e.g., a DA queue ID associated with a DA queue enqueuing one or more dependent or conditioned work requests); one or more conditions to be met to enable processing a dependent work request (and/or, a dependent DA queue) associated with the dependency; and/or, one or more conditioned actions to perform when such conditions are met, such as described in reference to methods 100 and 200 of FIGS. 1 and 2, respectively.

FIG. 3A illustrates dependencies 322 and 326 as included in DA queues 308A and 308B, respectively. However, in embodiments dependencies 322 and 326 can be included (in whole or in part) in any component of a DA server, and/or a processor coupled to a DA server (e.g., a host processor executing a requester or dataflow application). Dependencies 322 and 326 can comprise individual data structures (e.g., a list or array of elements of dependencies and/or dependency parameters, such as will be seen in the example of FIG. 3B), and/or can comprise, or be included in, another data structure, such as a heap or Min-Heap.

In embodiments, such as the example embodiment of system 300, an interface for a requester and a DA server (and/or, other components of an RDS), can comprise a DA framework, such as previously described. In FIG. 3A interface 302 can comprise or, can be included in, a DA framework. FIG. 3A depicts optional framework 306, which can be included in interface 302 or, alternatively, can itself include interface 302.

Interface 302 (and/or a DA framework of an interface, such as 306) can comprise, for example, an API of system 300 (e.g., an API of host 340, DA server 304, and/or a DA framework), a CLI of system 300 (e.g., an API of host 340, DA server 304, and/or a DA framework), a message protocol (e.g., a request/response message protocol of a DA framework), and/or a communications interface. However, these examples are not intended to limit embodiments and it would be apparent to one or ordinary skill in the art that an interface, such as 302, between a host computing system, a requester, and a DA server can comprise any form of communications interface and/or technologies suitable for communications between computing elements of a system.

In embodiments an interface for a requester and a DA server (and/or, other components of an RDS) can comprise a DA framework, such as previously described. Accordingly, in FIG. 3A interface 302 can comprise or, can be included in, a DA framework. FIG. 3A depicts optional framework 306, which can be included in interface 302 or, alternatively, can itself include interface 302.

Using interface 302, requester 342 (and/or, host 340) can, for example, communicate and interact with DA server 304 (and/or components of DA server 304), such as to perform operations of methods similar or equivalent to example methods 100 and/or 200 in respective FIGS. 1 and 2. For example, using interface 302 requester 342 (and/or, host 340) can communicate with DA server 304 to allocate one or both of DA queues 308A and 308B, such as in operation 102 of method 100 of FIG. 1, and/or 202 of method 200 of FIG. 2. Using interface 302, requester 342 (and/or, host 340) can communicate to DA server 304 (and/or for DA server 304 to receive) work requests among WRs 320 and/or 324; can communicate to DA server 304 dependencies among dependencies 322 and/or 326; and/or can enqueue work requests to one or both of DA queues 308A and 308B. Using interface 302, requester 342 (and/or, host 340) can initiate and/or suspend DA server 304 processing of one or both of DA queues 308A and 308B and/or work requests among WRs 320 and/or 324; and/or can receive results of DA server 304 operating on DA queues 308A and 308B and/or work requests among WRs 320 and/or 324. Using interface 302 requester 342 (and/or, host 340)

FIG. 3B depicts an example work request and dependency structure that, in embodiments, can comprise work requests and dependencies/dependency parameters that can be included in a DA server (and/or DA queues) such as described in reference to FIGS. 1 and 2, and illustrated in FIG. 3A as WRs 320 and 324 and dependencies 322 and 326. The examples of FIG. 3B can be work requests and/or dependencies utilized in one or both of methods 100 and 200 of respective FIGS. 1 and 2.

FIG. 3B illustrates example work request 330 comprising work request identifier WID 332, function 334, data 336, and optional dependencies 338. In embodiments, WID 332 can comprise an identifier of a work request enqueued to a DA queue among DA queues of a DA servers, such as an identity of work request WR 320A, WR 320B, WR 324A, and/or WR 324B in FIG. 3A. Data 336 can comprise data associated with an application, such as a dataflow application comprising work requests of a requester, such as an application comprising work requests among work requests WRs 320 and/or WRs 324. Data 336 can comprise data such as (but, not limited to) matrix data, tensor data, natural language data, image data, audio data, and/or video data.

Function 334 can represent one or more functions for a DA server, such as 304 in FIG. 3A, to perform on data included in data 336. Such functions can include (but, are not limited to), for example, functions of an AI application, image processing application, a stream processing application, and/or other dataflow applications or applications associated with highly-parallel data processing. Data 336 can comprise data associated with function 334, such as information to control processing of work request 330, such as identifiers of particular RDS resources, or types of RDS resources, to use in processing work request 330.

Also as previously described, a dependency of a work request or DA queue can comprise an identifier of a dependent or conditioned queue, one or more conditions associated with the work request and/or the dependent or conditioned queue, and/or conditioned actions to take upon satisfying such conditions. FIG. 3B illustrates example dependency 350 comprising dependency parameters WID 352, DA queue ID 354, conditions 356, actions 358, and primitives 360. In embodiments, WID 352 can comprise an identify, or identities, of one or more work requests (such as among WRs 320 and/or 324 in FIG. 3A) having a dependency on another work request and/or DA queue. Additionally, or alternatively, WID 352 can comprise an identify, or identities, of one or more work requests (such as among WRs 320 and/or 324 in FIG. 3A) upon which a work request, and/or DA queue, is a dependent. A work request can include one or more dependency structures and, in FIG. 3B, dependencies 338 can comprise one or more dependency structures similar or equivalent to dependency 350.

DA queue ID 354 can identify a dependent DA queue on which one or more dependent work requests are enqueued. Alternatively, or additionally, DA queue ID 354 can identify a conditioned DA queue on which one or more conditioned work requests are enqueued. Conditions 356 can represent conditions to be met to process a work request identified by WID 352 and/or the DA queue identified by DA queue ID 354. Actions 358 can represent conditioned actions for a DA server (such as 304 in FIG. 3A) to take upon meeting one or more of the conditions included in conditions 356. Conditions 356 can be associated with a concurrency primitive, such as a concurrency primitive included in primitives 360.

Primitives 360, in embodiments, can comprise concurrency primitives, such as previously described. Primitives among 360 can be utilized (e.g., by one or more DA server processes) to activate, suspend, and/or resume processing (e.g., by DA workers) of one or more work requests. Primitives 360 can comprise condition variables, such as condition variables associated with conditions included in conditions of a dependency structure, such as conditions 356 of dependency 350. An action of a dependency, such as an action among actions 358, can comprise operating on a condition variable, such as unblocking ("waking") a DA worker (e.g., a process thread of a DA worker) blocked on the condition variable. While not shown explicitly in FIG. $3B, a condition variable can be included in a dependency structure, such as 350. For example, a condition variable can be a component of conditions 356, actions 358, or primitives 360.

To further illustrate registering dependencies with DA queues in a system such as the example system 300 of FIG. 3A, work request 320A in FIG. 3A can comprise a work request like work request 330 in FIG. 3B. Dependencies 322A and/or 326A can comprise a dependency structure such as dependency 350 in FIG. 3B.

In one example, dependency 322A can represent, for example, a queue-to-queue dependency, registered with DA queue 308A, of DA queue 308A (e.g., WRs 320 enqueued to DA queue 308A) on DA queue 308B (e.g., on all of WRs 324 as enqueued to DA queue 308B). A dependency structure of dependency 322A can include a DA queue ID, such as 354 in FIG. 3B, identifying DA queue 308B as a conditioned queue on which DA queue 308A is dependent. Dependency 322A can include conditions, such as 356 in FIG. 3B, to be met to process work requests WRs 320 enqueued to DA queue 308A (e.g., that all work requests enqueued to DA queue 308B have reached a particular processing state); and, conditioned actions of dependency 322A, such as 358 in FIG. 3B, can identify conditioned actions take upon meeting the conditions in dependency 322A.

Alternatively, or additionally, dependency 326A can represent the queue-to-queue dependency, registered with DA queue 308B, of work requests enqueued to DA queue 308A on DA queue 308B. A dependency structure of dependency 326A can include a DA queue ID, such as 354 in FIG. 3B, identifying DA queue 308A as a DA queue dependent on all work requests enqueued to DA queue 308B. Dependency 322A and/or 326A can include conditions, such as 356 in FIG. 3B, identifying conditions to be met to process WRs 320 enqueued to DA queue 308A; and/or can include conditioned actions, such as 356 in FIG. 3B, to take upon meeting the conditions.

In another example, dependency 322A can represent a request-to-queue dependency, registered with DA queue 308A, of WR 320A on DA queue 308B (e.g., a dependency of WR 320A on all of WRs 324 as enqueued to DA queue 308B). A DA queue ID, such as 354 in FIG. 3B, of dependency 322A can identify DA queue 308B as a conditioned queue and a WID, such as 352 in FIG. 3B, of dependency 326A can identify WR 320A as a work request having the request-to-queue dependency on dependent on DA queue 308B. Dependency 322A can include conditions, such as 356 in FIG. 3B, to be met to process WR 320A (e.g., that all work requests enqueued to DA queue 308B have reached a particular processing state); and, conditioned actions of dependency 322A, such as 358 in FIG. 3B, can identify conditioned actions take upon meeting the conditions in dependency 322A.

Additionally, or alternatively, dependency 326A can represent the request-to-queue dependency of work request 320A, registered with DA queue 308B, on work requests enqueued to DA queue 308B. ADA queue ID, such as 354 in FIG. 3B, of dependency 326A can identify DA queue 308A as having a work request with a request-to-queue dependency on DA queue 308B. A WID of dependency 326A, such as WID 352 in FIG. 3B, can identify WR 320A as a work request having the request-to-queue dependency on DA queue 308B. Conditions of dependency 326A, such as 356 in FIG. 3B, can identify conditions to be met to process WR 320A; and, conditioned actions of dependency 326A, such as 358 in FIG. 3B, can identify conditioned actions take upon meeting the conditions in dependency 326A.

In yet another example, dependency 322A can represent a request-to-request dependency, registered with DA queue 308A, of WR 320A on WR 324A. A WID, such as 352 in FIG. 3B, of dependency 322A can identify WR 320A as dependent on WR 324A. Similarly, a WID of dependency 322A can identify WR 324A as a conditioned work request on which WR 320A has the request-to-request dependency. A DA queue ID, such as 354 in FIG. 3B, of dependency 322A can identify DA queue 308B as a conditioned queue on which WR 324A is enqueued. Conditions of dependency 322A, such as 356 in FIG. 3B, can identify conditions to be met to process WR 320A; and, conditioned actions of dependency 322A, such as 358 in FIG. 3B, can identify conditioned actions take upon meeting the conditions in dependency 322A.

Additionally, or alternatively, dependency 326A can represent the request-to-request dependency of work request 320A on work request 324A as registered with DA queue 308B. A WID, such as 352 in FIG. 3B, of dependency 326A can identify WR 320A as a work request dependent on WR 324A. A WID of dependency 326A can identify WR 324A as a conditioned work request on which WR 320A is dependent. A DA queue ID, such as 354 in FIG. 3B, of dependency 326A can identify DA queue 308A as a dependent queue having WR 320A. Conditions of dependency 326A, such as 356 in FIG. 3B, can identify conditions to be met to process WR 320A; and, conditioned actions of dependency 326A, such as 358 in FIG. 3B, can identify conditioned actions take upon meeting the conditions in dependency 326A.

While the examples of FIGS. 3A and 3B depict various elements as included among particular, other elements, this is not intended to limit embodiments. It would be apparent to one of ordinary skill in the art that the example elements of FIGS. 3A and 3B, can be configured and/or combined other than as shown in FIGS. 3A and/or 3B. It would be further evident to one of ordinary skill in the are that various equivalents can be substituted for, and/or combined with, the example elements of FIGS. 3A and 3B within the spirit and scope of the disclosure.

Embodiments can comprise a computer program product and can include a computer readable storage medium (or media) having computer readable program instructions of the computer program product incorporated therein. It will be understood by one of ordinary skill in the art that computer readable program instructions can implement each or any combination of operations and/or structure of the disclosure, such as illustrated by the drawings and described herein.

The computer readable program instructions can be provided to one or more processors, and/or other elements, of a computing system or apparatus to produce a machine which can execute, via the processor(s), to implement operations and/or actions similar or equivalent to those of the disclosure. The computer readable program instructions can be stored in a computer readable storage medium that can direct one or more processors, and/or other elements, of a computing system or apparatus to function in a particular manner, such that the computer readable storage medium comprises an article of manufacture including instructions to implement operations and/or structures similar or equivalent to those of the disclosure.

The computer readable program instructions of the computer program product can cause one or more processors to perform operations of the disclosure. A sequence of program instructions, and/or an assembly of one or more interrelated programming modules, of the computer program product can direct one or more one or more processors and/or computing elements of a computing system to implement the elements and/or operations of the disclosure including, but not limited to, the structures and operations illustrated and/or described in the present disclosure.

A computer readable storage medium can comprise any tangible (e.g., hardware) device, or combination of tangible devices, that can store instructions of the computer program product and that can be read by a computing element to download the instructions for use by a processor. A computer readable storage medium can comprise, but is not limited to, electronic, magnetic, optical, electromagnetic, and/or semiconductor storage devices, or any combination of these. A computer readable storage medium can comprise a portable storage medium, such as a magnetic disk/diskette, optical disk (CD or DVD); a volatile and/or non-volatile memory; a memory stick, a mechanically encoded device, and any combination of these. A computer readable storage medium, as used herein, is not to be construed as being transitory electrical and/or electromagnetic signals per se.

The computer readable program instructions can be communicated from the computer readable storage medium, to the one or more computing/processing devices, via a programming API of a computing system, and/or a communications interface of a computing system, having access to the computer readable storage medium, and/or a programming API of a computing system, and/or a communications interface of the one or more computing/processing devices. The API(s) and/or communications interface(s) can couple communicatively and/or operatively to a network, such as the Internet, a local area network, a wide area network, and/or a wireless network. The API(s) and/or communications interface(s) can receive the computer readable program instructions read from computer readable storage medium and can forward the computer readable program instructions to the one or more computing/processing devices via the API(s), communications interface(s), and/or network.

In embodiments, the computer readable program instructions of the computer program product can comprise machine language and/or assembly language instructions, instruction-set-architecture (ISA) instructions, microcode and/or firmware instructions, state-setting data, configuration data for integrated circuitry, source code, and/or object code. The instructions and/or data can be written in any combination of one or more programming languages.

The computer readable program instructions can execute entirely, or in part, on a user's computer, as a stand-alone software package; partly on a user's computer and partly on a remote computer; or, entirely on a remote computer. A remote computer can be connected to a user's computer through any type of network, including a local area network (LAN) or a wide area network (WAN). In embodiments, electronic circuitry including, for example, FPGA, PLAs, and or CGRAs can execute the computer readable program instructions by utilizing state information of the computer readable program instructions to configure the electronic circuitry to perform operations or elements of the disclosure, such as illustrated by the drawings and described herein.

In embodiments, computer readable program instructions can also be loaded onto a computing system, or component(s) thereof, to cause the computing system and/or component(s) thereof to perform a series of operational steps to produce a computer implemented process, such that the instructions which execute on the computing system, or component(s) thereof, implement the operations or elements of the disclosure, such as illustrated by the drawings and described herein.

The flowchart and block diagrams in the drawings illustrate the architecture, functionality, and operation of possible implementations of systems, methods, and computer program products according to various embodiments of the disclosure. Individual elements illustrated in the drawings— such as individual operations illustrated in the flowcharts or individual blocks of block diagrams—may represent a module, segment, or portion of executable instructions for implementing the disclosed function(s).

In various alternative implementations, particular operations may occur in an order differing from that illustrated in the examples of the drawings. For example, two operations shown in succession in a diagram of the disclosure may, in a particular embodiment, be executed substantially concurrently, or may sometimes be executed in a reverse order, depending upon the functionality involved. It will be further noted that particular blocks of the block diagrams, operations of the flowchart illustrations, and/or combinations of blocks in the block diagrams and/or flowchart illustrations, can be implemented using special purpose hardware and/or systems that, individually or in combination, perform the specified functions, acts, and/or computer instructions.

The examples of the various embodiments of the disclosure are presented for purposes of illustration, and are not intended to be exhaustive or to limit the embodiments disclosed and/or that may be conceived within the scope of the disclosure. Modifications and variations will be apparent to those of ordinary skill in the art within the scope and spirit of the disclosure. Terminology used herein, and the examples disclosed, are chosen to illustrate the principles of the embodiments, the practical application or technical improvement over alternative technologies, and to enable others of ordinary skill in the art to understand the embodiments disclosed herein.

As can be seen in the foregoing examples, embodiments can comprise methods, systems, and computer program products. A summary of such methods, systems, and computer programs can comprise the following:

Example Embodiment 1

A computer-implemented method comprises selecting for processing, by a dependency-aware (DA) server, a first work request, the first work request among a plurality of work requests enqueued among a plurality of DA queues, the first work request selected, by the DA server, from a first DA queue among the plurality of DA queues, the plurality of work requests comprising functions of an application to execute by the DA server.

The method further comprises determining, by the DA server, based on a processing dependency associated with the first DA queue, that processing a second work request, by the DA server, is dependent upon a processing condition, the second work request among the plurality of work requests enqueued among the plurality of DA queues, the processing dependency further associated with processing, by the DA server, the first work request, the processing condition included in the processing dependency; determining, by the DA server, that the processing condition has not been met; and, deferring, by the DA server, responsive to the determining that the processing condition has not been met, processing of the second work request.

Example Embodiment 2

The method of example embodiment 1, the method further comprising receiving, by the DA server, from a work requester communicatively coupled to the DA server, the plurality of work requests; receiving, by the DA server, from the work requester, processing dependencies associated with the plurality of work requests, the processing dependency included among the processing dependencies associated with the plurality of work requests; and, responsive to the receiving the processing dependencies, the DA server registering the processing dependency in association with the first DA queue.

Example Embodiment 3

The method of example embodiment 1, the method further comprising selecting for processing, by the DA server, a third work request, the third work request among the plurality of work requests enqueued among the plurality of DA queues; processing, by the DA server, the third work request; determining, by the DA server, in association with the processing of the third work request and based on the processing dependency associated with the first DA queue, that the processing condition has been met; and, processing, by the DA server, based on determining that the processing condition has been met, the second work request.

Example Embodiment 4

The method of example embodiment 1, wherein the processing dependency comprises a conditioned action associated with the processing of the first work request; and, wherein the DA server processing the first work request comprises the DA server performing the conditioned action.

Example Embodiment 5

The method of example embodiment 4, wherein the conditioned action is associated with a concurrency primitive; and, wherein the DA server performing the conditioned action comprises the DA server performing an operation associated with the concurrency primitive.

Example Embodiment 6

The method of example embodiment 1, wherein the processing dependency comprises a dependency relationship selected from a group consisting of a request-to-request dependency, a request-to-queue dependency, and a queue-to-queue dependency.

Example Embodiment 7

The method of example embodiment 1, wherein the DA server is communicatively coupled to a work requester; wherein the processing dependency is included in a DA framework of a computing system comprising the DA server and a work requester; and, wherein the method further comprises the DA server receiving at least one of the first work request and the processing dependency from the work requester via an interface of the DA framework.

Example Embodiment 8

The method of example embodiment 1, wherein the processing dependency comprises a dependency parameter selected from a group consisting of: a work request identifier of at least one of the first work request and a conditioned work request upon which the first work request is dependent, a DA queue identifier of at least one of the first DA queue and a conditioned DA queue upon which the first work request is dependent, a condition for processing the first work request, a conditioned action, and a concurrency primitive.

Example Embodiment 9

The method of example embodiment 1, wherein the first DA queue is included, at least in part, in a memory of the DA server.

Example Embodiment 10

The method of example embodiment 1, wherein the first DA queue is included, at least in part, in a memory of the requester.

Example Embodiment 11

The method of example embodiment 1, wherein the DA server is included in a reconfigurable dataflow system.

Example Embodiment 12

The method of example embodiment 1, wherein the DA server comprises a reconfigurable dataflow unit included in a reconfigurable dataflow system.

Example Embodiment 13

A computing system comprising: a plurality of dependency-aware (DA) queues; a DA server, the DA server comprising a processor; and, a plurality of work requests enqueued among the plurality of DA queues, the plurality of work requests comprising functions of an application to execute by the DA server. The DA server is configured to select for processing, a first work request, the first work request among the plurality of work requests, the first work request selected, by the DA server, from a first DA queue among the plurality of DA queues.

The DA server is further configured to determine, based on a processing dependency associated with the first DA queue, that processing a second work request, by the DA server, is dependent upon a processing condition, the second work request among the plurality of work requests, the processing dependency further associated with processing, by the DA server, the first work request, the processing condition included in the processing dependency; determine that the condition has not been met; and, responsive to the determining that the condition has not been met, defer processing of the second work request.

Example Embodiment 14

The computing system of example embodiment 13, wherein the DA server is further configured to receive, from a work requester communicatively coupled to the DA server, the plurality of work requests; receive, from the work requester, processing dependencies associated with the plurality of work requests, the processing dependency included among the processing dependencies associated with the plurality of work requests; and, responsive to the receiving the processing dependencies, register the processing dependency, in association with the first DA queue.

Example Embodiment 15

The computing system of example embodiment 13, wherein the DA server is further configured to select for processing, by the DA server, a third work request, the third work request among the plurality of work requests enqueued among the plurality of DA queues; process the third work request; determine, in association with the processing the third work request and based on the processing dependency associated with the first DA queue, that the processing condition has been met; and, process, based on determining that the processing condition has been met, the second work request.

Example Embodiment 16

The computing system of example embodiment 13, wherein the processing dependency comprises a conditioned action associated with the DA server processing the first work request; and, wherein the DA server configured to process first work request comprises the DA server further configured to perform the conditioned action.

Example Embodiment 17

The computing system of example embodiment 16, wherein the conditioned action is associated with a concurrency primitive; and, wherein the DA server configured to perform the conditioned action comprises the DA server further configured to perform an operation associated with the concurrency primitive.

Example Embodiment 18

The computing system of example embodiment 13, wherein the processing dependency comprises a dependency relationship selected from a group consisting of a request-to-request dependency, a request-to-queue dependency, and a queue-to-queue dependency.

Example Embodiment 19

The computing system of example embodiment 13, wherein the processing dependency associated with the first DA queue comprises a dependency parameter of the processing dependency; wherein the DA server is further configured to record the dependency parameter in a dependency structure associated with the first DA queue; and, wherein the DA server configured to determine that processing the second work request is dependent upon the processing condition comprises the DA server further configured to determine that processing the second work request is dependent upon the processing condition based on the dependency parameter recorded in the dependency structure.

Example Embodiment 20

The computing system of example embodiment 13, wherein the processing dependency associated with the first DA queue comprises a dependency parameter of the processing dependency selected from a group consisting of: a work request identifier of at least one of a dependent work request and a conditioned work request, a DA queue identifier of at least one of a dependent DA queue and a conditioned DA queue, a condition for processing the dependent work request, a conditioned action, and a concurrency primitive.

Example Embodiment 21

The computing system of example embodiment 13, wherein the system further comprises a reconfigurable dataflow system.

Example Embodiment 22

The computing system of example embodiment 13, wherein the processor comprises a reconfigurable dataflow unit included in a reconfigurable dataflow system.

Example Embodiment 23

The computing system of example embodiment 13, wherein the DA server comprises a DA worker; and, wherein the DA worker is configured to process at least one of the first DA queue and the first work request.

Example Embodiment 24

The computing system of example embodiment 13, wherein the DA server comprises a process executable on a reconfigurable dataflow unit included in a reconfigurable dataflow system.

Example Embodiment 25

The computing system of example embodiment 13, wherein the system further comprises a DA framework; wherein the DA server is communicatively coupled to a work requester; wherein the processing dependency is included in the DA framework; and, wherein the DA server is further configured to receive at least one of the first work request and the processing dependency from the work requester via an interface of the DA framework.

Example Embodiment 26

A computer program product comprising a computer readable storage medium having program instructions embodied therewith, wherein the program instructions are executable by at least one processor of a computing system to cause the at least one processor to: select for processing, a first work request, the first work request among a plurality of work requests enqueued among a plurality of dependency-aware (DA) queues, the first work request selected for processing from a first DA queue among the plurality of DA queues, the plurality of work requests comprising functions of an application to process by the at least one processor; determine, based on a processing dependency associated with the first DA queue, that processing a second work request, by the at least one processor, is dependent upon a processing condition, the second work request among the plurality of work requests enqueued among the plurality of DA queues, the processing dependency further associated with processing, by the at least one processor, the first work request, the processing condition included in the processing dependency; determine that the processing condition has not been met; and, defer, based on the determining that the processing condition has not been met, processing, by the at least one processor, of the second work request.

Example Embodiment 27

The computer program product of example embodiment 26, the program instructions executable by the at least one processor further comprising instructions executable by the at least one processor to receive, from a work requester communicatively coupled to the at least one processor, the plurality of work requests; receive, from the work requester, processing dependencies associated with the plurality of work requests, the processing dependency included among the processing dependencies associated with the plurality of work requests; and, responsive to the receiving the processing dependencies, register, in association with the first DA queue, the processing dependency.

Example Embodiment 28

The computer program product of example embodiment 26, the program instructions executable by the at least one processor further comprising instructions executable by the at least one processor to cause the at least one processor to select for processing, a third work request, the third work request among the plurality of work requests enqueued among the plurality of DA queues; process, by the at least one processor, the third work request; determine, in association with the processing of the third work request and based on the processing dependency associated with the first DA queue, that the processing condition has been met; and, process, by the at least one processor, based on determining that the processing condition has been met, the second work request.

Example Embodiment 29

The computer program product of example embodiment 26, the program instructions executable by the at least one processor further comprising instructions executable by the at least one processor to cause the at least one processor to enqueue the first work request to the first DA queue.

Example Embodiment 30

The computer program product of example embodiment 26, wherein the at least one processor is included in a DA server; and, wherein the program instructions executable by the at least one processor further comprise program instructions included in a program of the DA server.

Example Embodiment

The computer program product of example embodiment 26, wherein the at least one processor is included in a work requester; and, wherein the program instructions executable by the at least one processor further comprise program instructions included in a program of the work requester.

Example Embodiment 32

A computer-implemented method comprising: generating, by a work requester, a plurality of work requests, the plurality of work requests comprising functions of an application to execute by a dependency-aware (DA) server;

determining, by the work requester, processing dependencies associated with the plurality of work requests; and communicating, by the work requester, to the DA server, the processing dependencies.

The method further comprises enqueueing, by the work requester, on a dependent queue among a plurality of DA queues, based on a first processing dependency among the processing dependencies, a first work request, the first work request among the plurality of work requests, the first processing dependency associated with the DA server processing the first work request; and, enqueueing, by the work requester, to a conditioned queue among the plurality of DA queues, based on a second processing dependency among the processing dependencies, a second work request, the second work request among the plurality of work requests, the second processing condition associated with the DA server processing the second work request.

Example Embodiment 33

The method of example embodiment 32, wherein the work requester determining the processing dependencies comprises wherein the work requester determining the processing dependencies based on dependency parameters of a DA framework of a reconfigurable dataflow system; and, wherein the work requester communicating the dependencies to the DA server comprises the work requester communicating the dependencies to the DA server using an interface of the DA framework.

Example Embodiment 34

The method of example embodiment 32, wherein the DA server is included in a reconfigurable dataflow system.

Example Embodiment 35

The method of example embodiment 34, wherein the work requester is included in host computer communicatively coupled to the reconfigurable dataflow system.

Example Embodiment 36

The method of example embodiment 32, the method further comprising: receiving, by the DA server from the work requester, the processing dependencies; and, registering, by the DA server, responsive to the DA server receiving the processing dependencies, a processing dependency, among the processing dependences, in association with at least one of the dependent and the conditioned DA queues.

Example Embodiment 37

The method of example embodiment 32, wherein at least one of the dependent and the conditioned DA queues are included, at least in part, in a memory of the work requester.

Example Embodiment 38

The method of example embodiment 32, wherein at least one of the dependent and the conditioned DA queues are included, at least in part, in a memory of the DA server.

Example Embodiment 39

The method of example embodiment 32, the method further comprising the work requester allocating at least one of the dependent and the conditioned DA queues.

Example Embodiment 40

The method of example embodiment 32, the method further comprising a runtime processor allocating at least one of the dependent and the conditioned DA queues, the runtime processor associated with executing the application by the DA server.

Example Embodiment 41

The method of example embodiment 32, the method further comprising the work requester communicating a queue allocation request to the DA server to allocate at least one of the dependent and the conditioned DA queues; and, responsive to the communicating the queue allocation request to the DA server, the work requester receiving, from the DA server, an identity of the at least one of the dependent and the conditioned DA queues.

Example Embodiment 42

The method of example embodiment 32, wherein the first processing dependency comprises a condition for processing, by the DA server, the first work request.

Example Embodiment 43

The method of example embodiment 32, wherein the first processing dependency comprises a conditioned action associated with the DA server processing the second work request.

Example Embodiment 44

A computing system comprising a plurality of DA queues; a processor; and, a work requester executable on the processor. The work requester is configured to generate a plurality of work requests, the plurality of work requests comprising functions of an application to execute by a dependency-aware (DA) server; determine processing dependencies associated with the plurality of work requests; communicate, to the DA server, the processing dependencies.

The work requester is further configured to enqueue, on a dependent queue among the plurality of DA queues, based on a first processing dependency among the processing dependencies, a first work request, the first work request among the plurality of work requests, the first processing dependency associated with the DA server processing the first work request; and, enqueue, to a conditioned queue among the plurality of DA queues, based on a second processing dependency among the processing dependencies, a second work request, the second work request among the plurality of work requests, the second processing condition associated with the DA server processing the second work request.

Example Embodiment 45

The computing system of example embodiment 44, wherein the work requester configured to determine processing dependencies comprises the work requester further configured to determine the processing dependencies based on dependency parameters of a DA framework of a reconfigurable dataflow system; and, wherein the work requester configured to communicate the dependencies to the DA server comprises the work requester further configured to communicate the dependencies to the DA server using an interface of the DA framework.

Example Embodiment 46

The computing system of example embodiment 44, wherein the work requester is included in a host computing system communicatively coupled to the DA server.

Example Embodiment 47

The computing system of example embodiment 44, wherein the DA server is included in a reconfigurable dataflow system.

Example Embodiment 48

The computing system of example embodiment 44, wherein at least one of the dependent and the conditioned DA queues are included, at least in part, in a memory of the work requester.

Example Embodiment 49

The computing system of example embodiment 44, wherein the DA server comprises a memory; and, wherein at least one of the dependent and the conditioned DA queues are included, at least in part, in the memory of the DA server.

Example Embodiment 50

The computing system of example embodiment 44, wherein the system further comprises a runtime processor, the runtime processor configured to manage executing the application by the DA server; and, wherein the runtime processor is further configured to allocate at least one of the dependent and the conditioned DA queues.

Example Embodiment 51

The computing system of example embodiment 44, wherein the work requester is further configured to communicate a DA queue allocation request, to the DA server, to allocate at least one of the dependent and the conditioned DA queues; and, responsive to the communicating the DA queue allocation request to the DA server, receive, from the DA server, an identity of the at least one of the dependent and the conditioned DA queues.

Example Embodiment 52

The computing system of example embodiment 44, wherein the processing dependencies comprise a dependency parameter selected from a group consisting of: a work request identifier, a DA queue identifier, a processing condition, a conditioned action, and a concurrency primitive associated with a conditioned action.

Example Embodiment 53

A computer program product comprising a computer readable storage medium having program instructions embodied therewith, wherein the program instructions are executable by at least one processor of a computing system to cause the at least one processor to generate a plurality of work requests to be processed by a dependency-aware (DA) server, the plurality of work requests comprising functions of an application to execute by a dependency-aware (DA) server; determine processing dependencies associated with the plurality of work requests; communicate, to the DA server, the processing dependencies; enqueue, on a dependent queue among a plurality of DA queues, based on a first processing dependency among the processing dependencies, a first work request, the first work request among the plurality of work requests, the first processing dependency associated with the DA server processing the first work request; and, enqueue, to a conditioned queue among the plurality of DA queues, based on a second processing dependency among the processing dependencies, a second work request, the second work request among the plurality of work requests, the second processing condition associated with the DA server processing the second work request.

Example Embodiment 54

The computer program product of example embodiment 53, the program instructions executable by the at least one processor further comprising instructions executable by the at least one processor to communicate, to the DA server, a DA queue allocation request to allocate at least one of the dependent and the conditioned DA queues; and, responsive to the communicating the DA queue allocation request to the DA server, receive, from the DA server, an identity of the at least one of the dependent and the conditioned DA queues.

Example Embodiment 55

The computer program product of example embodiment 53, the program instructions executable by the at least one processor further comprising instructions executable by the at least one processor to communicate, to a runtime processor, a queue allocation request to allocate at least one of the dependent and the conditioned DA queues, the runtime processor associated with executing the application by the DA server; and, responsive to the communicating the queue allocation request to runtime processor, receive, from the runtime processor, an identity of the at least one of the dependent and the conditioned DA queues.

Example Embodiment 56

The computer program product of example embodiment 53, the program instructions executable by the at least one processor further comprising instructions executable by the at least one processor to determine the processing dependencies based on dependency parameters of a DA framework of a reconfigurable dataflow system; and, communicate the dependencies to the DA server using an interface of the DA framework.

What is claimed is:
1. A computer-implemented method comprising:
receiving, by a dependency-aware (DA) server comprising one or more reconfigurable processors, a first work request from a first DA queue among a plurality of work requests enqueued among a plurality of DA queues, wherein:
the plurality of DA queues are configured for execution on the one or more reconfigurable processors,

the plurality of work requests comprise functions of an application to be executed by the one or more reconfigurable processors on the DA server,
the first DA queue is associated with a processing dependency associated with processing the first work request,
processing a second work request is dependent upon a processing condition included in the processing dependency, and
the second work request is enqueued in a second DA queue among the plurality of DA queues;
responsive to the processing condition not being met, the DA server:
deferring processing of the second work request on the one or more reconfigurable processors;
while deferring processing of the second work request, receiving a third work request enqueued in the second DA queue;
and
responsive to the third work request not being dependent upon the processing condition, processing the third work request, wherein processing the third request causes the processing condition to be met; and
responsive to the processing condition being met:
processing the second work request;
setting a value representing null data of a record of the processing condition; and
performing a conditioned action associated with the processing condition and a concurrency primitive, wherein:
the processing condition comprises a first DA queue identifier of the first DA queue,
the first DA queue identifier comprises an ordinal number and a memory address of the first DA queue, and
a second DA queue identifier of the second DA queue is based on the first DA queue identifier and a multiple of a stride.
2. The method of claim 1, further comprising:
receiving, by the DA server, from a work requester communicatively coupled to the DA server, the plurality of work requests;
receiving, by the DA server, from the work requester, processing dependencies associated with the plurality of work requests, the processing dependency included among the processing dependencies associated with the plurality of work requests; and;
responsive to the DA server receiving the processing dependencies, the DA server registering the processing dependency in association with the first DA queue.
3. The method of claim 1, wherein the processing dependency comprises the conditioned action associated with the processing of the first work request; and
wherein the DA server processing the first work request comprises the DA server performing the conditioned action.
4. The method of claim 3, wherein the conditioned action is associated with the concurrency primitive; and
wherein the DA server performing the conditioned action comprises the DA server performing an operation associated with the concurrency primitive.
5. The method of claim 1, wherein the processing dependency comprises a dependency relationship selected from a group consisting of a request-to-request dependency, a request-to-queue dependency, and a queue-to-queue dependency.

6. The method of claim 1, wherein the DA server is communicatively coupled to a work requester;

wherein the processing dependency is included in a DA framework of a computing system comprising the DA server and a work requester; and wherein the method further comprises the DA server receiving at least one of the first work request and the processing dependency from the work requester via an interface of the DA framework.

7. The method of claim 1, wherein the processing dependency comprises a dependency parameter selected from a group consisting of: a work request identifier of at least one of the first work request and a conditioned work request upon which the first work request is dependent, a DA queue identifier of at least one of the first DA queue and a conditioned DA queue upon which the first work request is dependent, a condition for processing the first work request, the conditioned action, and the concurrency primitive.

8. The method of claim 1, wherein the first DA queue is included, at least in part, in a memory of the DA server.

9. The method of claim 1, wherein the first DA queue is included, at least in part, in a memory of the requester.

10. The method of claim 1, wherein the DA server is included in a reconfigurable dataflow system.

11. The method of claim 1, wherein the DA server comprises a reconfigurable dataflow unit included in a reconfigurable dataflow system.

12. A computing system comprising:

a plurality of dependency-aware (DA) queues;

a DA server comprising one or more reconfigurable processors; and a plurality of work requests enqueued among the plurality of DA queues, wherein:

the plurality of DA queues are configured for execution on the one or more reconfigurable processors, the plurality of work requests comprise functions of an application to execute by the DA server, and the DA server is configured to:

receive a first work request from a first DA queue among the plurality of work requests enqueued among the plurality of DA queues, wherein:

the plurality of work requests comprise functions of an application to be executed by the one or more reconfigurable processors, the first DA queue is associated with a processing dependency associated with processing the first work request, processing a second work request is dependent upon a processing condition included in the processing dependency, and the second work request is enqueued in a second DA queue among the plurality of DA queues;

responsive to the processing condition has not been being met:

defer processing of the second work request on the one or more reconfigurable processors;

while deferring processing of the second work request, receive a third work request enqueued in the second DA queue;

and responsive to determining that processing the third work request not being dependent upon the processing condition, process the third work request, wherein processing the third request causes the processing condition to be met; and responsive to the processing condition being met:

processing the second work request;

setting a value representing null data of a record of the processing condition; and performing a conditioned action associated with the processing condition and a concurrency primitive, wherein:

the processing condition comprises a first DA queue identifier of the first DA queue, the first DA queue identifier comprises an ordinal number and a memory address of the first DA queue, and a second DA queue identifier of the second DA queue is based on the first DA queue identifier and a multiple of a stride.

13. The computing system of claim 12, wherein the DA server is further configured to:

receive, from a work requester communicatively coupled to the DA server, the plurality of work requests;

receive, from the work requester, processing dependencies associated with the plurality of work requests, the processing dependency included among the processing dependencies associated with the plurality of work requests; and responsive to the receiving the processing dependencies, register the processing dependency, in association with the first DA queue.

14. The computing system of claim 12, wherein the processing dependency comprises the conditioned action associated with the DA server processing the first work request; and wherein the DA server configured to process first work request comprises the DA server further configured to perform the conditioned action.

15. The computing system of claim 14, wherein the conditioned action is associated with the concurrency primitive; and wherein the DA server configured to perform the conditioned action comprises the DA server further configured to perform an operation associated with the concurrency primitive.

16. The computing system of claim 12, wherein the processing dependency comprises a dependency relationship selected from a group consisting of a request-to-request dependency, a request-to-queue dependency, and a queue-to-queue dependency.

17. The computing system of claim 12, wherein the processing dependency associated with the first DA queue comprises a dependency parameter of the processing dependency;

wherein the DA server is further configured to record the dependency parameter in a dependency structure associated with the first DA queue; and wherein processing the second work request is dependent upon the processing condition based on the dependency parameter recorded in the dependency structure.

18. The computing system of claim 12, wherein the processing dependency associated with the first DA queue comprises a dependency parameter of the processing dependency selected from a group consisting of: a work request identifier of at least one of a dependent work request and a conditioned work request, a DA queue identifier of at least one of a dependent DA queue and a conditioned DA queue, a condition for processing the dependent work request, the conditioned action, and the concurrency primitive.

19. The computing system of claim 12, wherein the system further comprises a reconfigurable dataflow system.

20. The computing system of claim 12, wherein the processor comprises a reconfigurable dataflow unit included in a reconfigurable dataflow system.

21. The computing system of claim 12, wherein the DA server comprises a DA worker; and wherein the DA worker is configured to process at least one of the first DA queue and the first work request.

22. The computing system of claim 12, wherein the DA server comprises a process executable on a reconfigurable dataflow unit included in a reconfigurable dataflow system.

23. The computing system of claim 12, wherein the system further comprises a DA framework;

wherein the DA server is communicatively coupled to a work requester;

wherein the processing dependency is included in the DA framework; and wherein the DA server is further configured to receive at least one of the first work request and the processing dependency from the work requester via an interface of the DA framework.

24. A computer program product comprising a computer readable storage medium having program instructions embodied therewith, wherein the program instructions are executable by at least one processor of a computing system to cause the at least one processor to:

receive a first work request from a first DA queue among a plurality of work requests enqueued among a plurality of DA queues, wherein:

the plurality of work requests comprise functions of an application to be processed by the at least one processor, the first DA queue is associated with a processing dependency associated with processing the first work request, processing a second work request is dependent upon a processing condition included in the processing dependency, and the second work request is enqueued in a second DA queue among the plurality of DA queues;

based on the processing condition not being met:

defer processing, by the at least one processor, of the second work request;

while deferring processing of the second work request, receive a third work request enqueued in the second DA queue;

and responsive to the third work request not being dependent upon the processing condition, process by the at least one processor, the third work request, wherein processing the third request causes the processing condition to be met; and responsive to the processing condition being met:

process the second work request;

set a value representing null data of a record of the processing condition; and perform a conditioned action associated with the processing condition and a concurrency primitive, wherein:

the processing condition comprises a first DA queue identifier of the first DA queue, the first DA queue identifier comprises an ordinal number and a memory address of the first DA queue, and a second DA queue identifier of the second DA queue is based on the first DA queue identifier and a multiple of a stride.

25. The computer program product of claim 24, the program instructions executable by the at least one processor further comprising instructions executable by the at least one processor to:

receive, from a work requester communicatively coupled to the at least one processor, the plurality of work requests;

receive, from the work requester, processing dependencies associated with the plurality of work requests, the processing dependency included among the processing dependencies associated with the plurality of work requests; and responsive to the receiving the processing dependencies, register, in association with the first DA queue, the processing dependency.

26. The computer program product of claim 24, the program instructions executable by the at least one processor further comprising instructions executable by the at least one processor to cause the at least one processor to enqueue the first work request to the first DA queue.

27. The computer program product of claim 24, wherein the at least one processor is included in a DA server; and wherein the program instructions executable by the at least one processor further comprise program instructions included in a program of the DA server.

28. The computer program product of claim 24, wherein the at least one processor is included in a work requester; and wherein the program instructions executable by the at least one processor further comprise program instructions included in a program of the work requester.

* * * * *